(12) United States Patent
Kuroda et al.

(10) Patent No.: US 11,776,754 B2
(45) Date of Patent: Oct. 3, 2023

(54) ELECTRONIC COMPONENT AND MOUNTING STRUCTURE

(71) Applicant: Murata Manufacturing Co., Ltd., Nagaokakyo (JP)

(72) Inventors: Shigeyuki Kuroda, Nagaokakyo (JP);
Yusuke Arakawa, Nagaokakyo (JP);
Chiaki Yamamoto, Nagaokakyo (JP);
Shinji Otani, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 119 days.

(21) Appl. No.: 17/510,549

(22) Filed: Oct. 26, 2021

(65) Prior Publication Data
US 2022/0044873 A1 Feb. 10, 2022

Related U.S. Application Data

(63) Continuation of application No. PCT/JP2020/016963, filed on Apr. 17, 2020.

(30) Foreign Application Priority Data

Apr. 26, 2019 (JP) .................................. 2019-086480
Oct. 1, 2019 (JP) .................................. 2019-181340

(51) Int. Cl.
*H01G 4/232* (2006.01)
*H01G 2/06* (2006.01)
(Continued)

(52) U.S. Cl.
CPC .......... *H01G 4/2325* (2013.01); *H01G 2/065* (2013.01); *H01G 4/248* (2013.01); *H01G 4/30* (2013.01)

(58) Field of Classification Search
CPC .......... H01G 4/2325; H01G 4/30; H01G 4/12; H01G 4/065; H01G 4/248; H01G 4/012;
(Continued)

(56) References Cited

U.S. PATENT DOCUMENTS

2002/0046861 A1* 4/2002 Yokoyama ............. H01G 4/232
174/565
2005/0095464 A1* 5/2005 Lee ....................... C01G 23/003
428/697
(Continued)

FOREIGN PATENT DOCUMENTS

JP H04334007 A 11/1992
JP H06196351 A 7/1994
(Continued)

OTHER PUBLICATIONS

International Search Report issued in PCT/JP2020/016963, dated Jul. 21, 2020.
Written Opinion of the International Searching Authority issued in PCT/JP2020/016963, dated Jul. 21, 2020.

*Primary Examiner* — Michael P McFadden
(74) *Attorney, Agent, or Firm* — ArentFox Schiff LLP

(57) ABSTRACT

An electronic component including a component body, and an external electrode on a surface of the component body. The external electrode includes a layer having an alloy of at least one first metal and at least one second metal, the at least one first metal is selected from the group consisting of metals of Group 9 to Group 11 of the Periodic Table, the at least one second metal has a melting point higher than that of the at least one first metal. In the layer having the alloy, a concentration of the at least one second metal continuously changes in a thickness direction of the external electrode, at least one first portion has the concentration of the at least one second metal increasing in the thickness direction, and at (Continued)

least one second portion has the concentration of the at least one second metal decreasing in the thickness direction.

19 Claims, 14 Drawing Sheets

(51) Int. Cl.
*H01G 4/248* (2006.01)
*H01G 4/30* (2006.01)

(58) Field of Classification Search
CPC .... H01G 4/1209; H01G 4/232; H01G 4/0085; H01G 4/1227
See application file for complete search history.

(56) References Cited

U.S. PATENT DOCUMENTS

2014/0340816 A1* 11/2014 Takaoka .................. H01G 4/30
361/305
2014/0375173 A1* 12/2014 Hamanaka ........... H10N 30/877
336/200
2018/0247765 A1* 8/2018 Yamamoto ............. H01C 7/003
2019/0385794 A1* 12/2019 Yanagisawa ......... H01G 4/1245

FOREIGN PATENT DOCUMENTS

| JP | 2004083955 A | 3/2004 |
| JP | 2016076582 A | 5/2016 |
| JP | 2018160596 A | 10/2018 |
| WO | 2013132965 A1 | 9/2013 |

* cited by examiner

ELECTRONIC COMPONENT AND MOUNTING STRUCTURE

CROSS REFERENCE TO RELATED APPLICATIONS

The present application is a continuation of International application No. PCT/JP2020/016963, filed Apr. 17, 2020, which claims priority to Japanese Patent Application No. 2019-086480, filed Apr. 26, 2019, and Japanese Patent Application No. 2019-181340, filed Oct. 1, 2019, the entire contents of each of which are incorporated herein by reference.

FIELD OF THE INVENTION

The present invention relates to an electronic component and a mounting structure including the electronic component.

BACKGROUND OF THE INVENTION

In general, an electronic component includes a component body and an external electrode provided on a surface of the component body, and when the electronic component is mounted on a substrate, the external electrode can be soldered to an electrode portion (for example, a land) formed on the substrate (in the present specification, a joint portion formed by the way described above is also referred to as a "solder joint portion"). For example, Patent Document 1 describes that in a multilayer ceramic capacitor having a terminal electrode (external electrode) at an end part of a laminate (component body) formed of an internal electrode layer and a dielectric layer, the terminal electrode is formed of an Ag based conductor film (base film), an Ni plated intermediate layer, and an external plating layer (Sn plating layer). Patent Document 1 discloses that when the thickness of the Ni-plating intermediate layer is adjusted to a predetermined thickness or more and the variation thereof is reduced, dissolution into solder of the Ag based conductor film, which may occur at the time of solder joining, can be effectively prevented, and a terminal electrode having excellent heat resistance (for example, 10 seconds at 270° C.) can be formed.

Patent Document 1: Japanese Patent Application Laid-Open No. 6-196351

SUMMARY OF THE INVENTION

It is required for a mounting structure in which an electronic component is mounted on a substrate to withstand use in a more severe temperature environment, for example, as in the case of being used in a circuit unit for electronic fuel injection control in an engine compartment of an automobile. When the mounting structure is used under such a severe high temperature environment, Ni contained in the Ni plating intermediate layer may be diffused (thermally diffused) into the solder joint portion at a relatively high speed in the structure as in Patent Document 1, whereby Ag may also be diffused from the Ag-based conductor film (base film) into the solder joint portion. As described above, in the solder material, the "dissolution into solder" in which Ag is lost from the Ag based conductor film due to diffusion into the solder joint portion may occur during the use of the mounting structure; as a result, the connection between the component body (laminate) in the electronic component and the Ag-based conductor film may be insufficient, and the connection reliability of the electronic component may be deteriorated.

An object of the present invention is to provide an electronic component capable of effectively suppressing diffusion of metal atoms from an external electrode to solder or a solder joint portion when the electronic component is exposed to a high-temperature environment after it is mounted on a substrate, and thus capable of obtaining high joining strength between the electronic component and the substrate. Further, an object of the present invention is to provide a mounting structure in which such an electronic component is mounted on a substrate.

The present invention relates to an electronic component that includes: a component body; and an external electrode on a surface of the component body, wherein the external electrode includes a layer having an alloy of at least one first metal and at least one second metal, the at least one first metal is selected from the group consisting of metals of Group 9 to Group 11 of the Periodic Table of the Elements, the at least one second metal has a melting point higher than a melting point of the at least one first metal, and in the layer having the alloy, a concentration of the at least one second metal continuously changes in a thickness direction of the external electrode, at least one first portion of the layer having the alloy has the concentration of the at least one second metal increasing in the thickness direction, and at least one second portion of the layer having the alloy has the concentration of the metal decreasing in the thickness direction.

In one aspect, the alloy is an Ni—Fe based alloy, and an Fe concentration continuously changes in a thickness direction of the external electrode, and the at least one first portion has the Fe concentration increasing and at least one second portion has the Fe concentration decreasing.

In another aspect, the present invention provides a mounting structure in which the electronic component is mounted on a substrate having an electrode portion, wherein the external electrode is joined to the electrode portion of the substrate through a solder joint portion.

In another aspect, in the mounting structure, the alloy is an Ni—Fe based alloy, an Fe concentration continuously changes in a thickness direction of the external electrode, the at least one first portion has the Fe concentration increasing and the at least one second portion has the Fe concentration decreasing.

According to the present invention, it is possible to provide an electronic component capable of effectively suppressing diffusion of metal atoms from an external electrode to solder or a solder joint portion when the electronic component is exposed to a high temperature environment after it is mounted on a substrate, and thus capable of obtaining high joint strength between the electronic component and the substrate. Furthermore, the present invention can provide a mounting structure in which such an electronic component is mounted on a substrate.

BRIEF EXPLANATION OF THE DRAWINGS

FIG. 10(a) 10 is a graph showing variation in Fe concentration of a layer having an Ni—Fe based alloy contained in an external electrode obtained in Test Example 2.

FIG. 11(a) 11 is a graph showing variation in Fe concentration of a layer having an Ni—Fe based alloy contained in an external electrode obtained in Test Example 3.

DETAILED DESCRIPTION OF THE INVENTION

Embodiment 1

Hereinafter, an electronic component will be explained as Embodiment 1.

An electronic component according to the present embodiment includes: a component body; and an external electrode on a surface of the component body, wherein the external electrode includes a layer having an alloy of at least one first metal and at least one second metal, the at least one first metal is selected from the group consisting of metals of Group 9 to Group 11 of the Periodic Table of the Elements, the at least one second metal has a melting point higher than a melting point of the at least one first metal, in the layer having the alloy, a concentration of the at least one second metal continuously changes in a thickness direction of the external electrode, and at least one first portion of the layer having the alloy has the concentration of the at least one second metal increasing in the thickness direction, and at least one second portion of the layer having the alloy has the concentration of the at least one second metal decreasing in the thickness direction.

In the present specification, the "layer having the alloy" refers to a "layer having the alloy of the at least one first metal and the at least one second metal" unless otherwise specified.

In the electronic component according to the present embodiment, the component body is not particularly limited as long as the external electrode can be provided on the surface of the component body, and examples thereof may include main bodies of electronic components that can be used as a capacitor, an inductor, a resistor, an LC composite component, and the like.

The component body can be configured using a commonly performed method without particular limitation.

The material of the component body is not particularly limited, and known materials may be used. Examples of such materials may include ceramics, resins, metals, and composites thereof, and specific examples thereof may include ceramics.

Figure 1A:
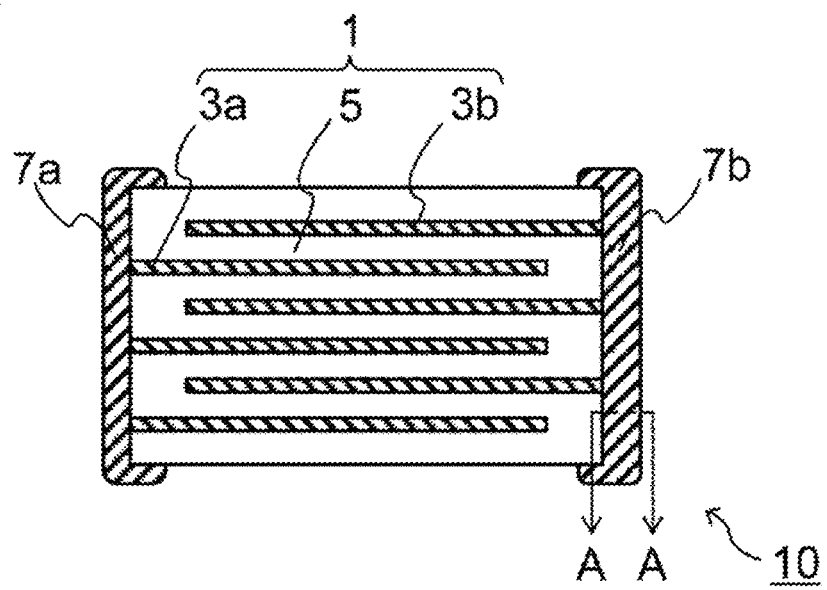
FIG. 1(a) is a schematic sectional view showing an electronic component according to one aspect of the present invention.

Typically, the electronic component of the present embodiment can be, for example, a multilayer ceramic capacitor 10 shown in FIG. 1(a). The multilayer ceramic capacitor 10 includes a component body 1 and external electrodes 7 provided on a surface of the component body. The component body 1 has internal electrodes 3 (3a and 3b in FIG. 1(a)) and dielectric portions (dielectric layers) 5. Note that the drawings include some schematic parts, and may not reflect actual dimensions and ratios.

Figure 7A:
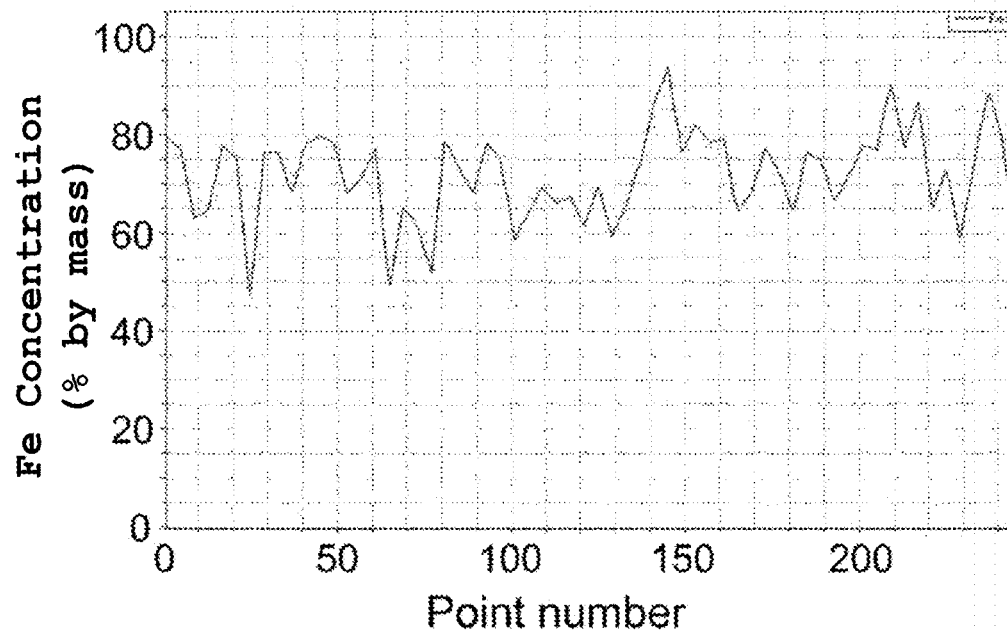
FIG. 7(a) is a graph showing variation in Fe concentration of a layer having an Ni—Fe based alloy contained in an external electrode obtained in Example 3.
Figure 7B:
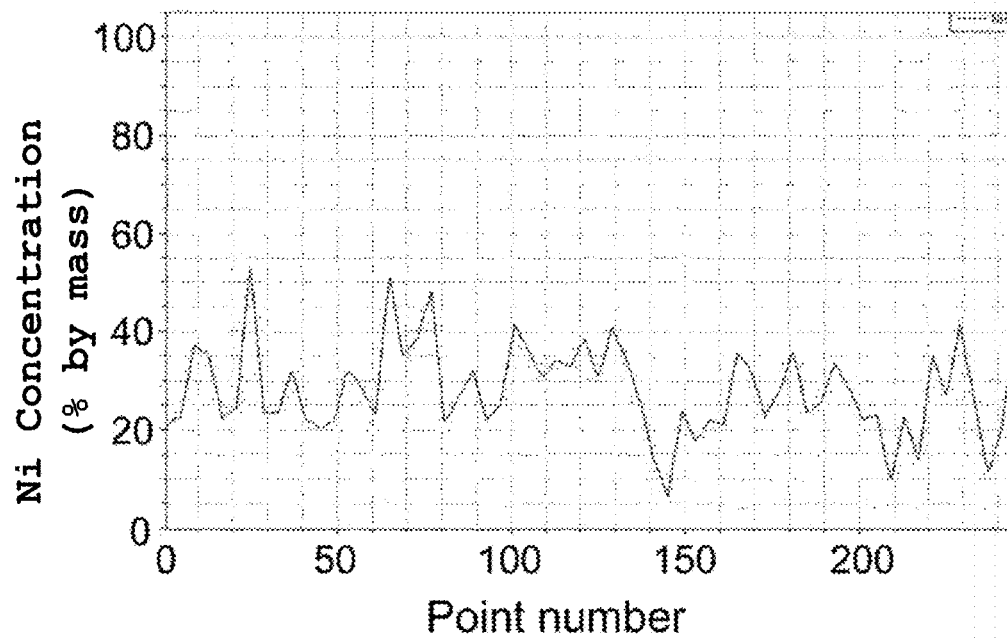
FIG. 7(b) is a graph showing variation in Ni concentration.

The number of the external electrodes is not particularly limited, and a plurality of external electrodes can be provided. In FIGS. 1(a), 7a and 7b are provided as the external electrode 7.

Figure 1B:
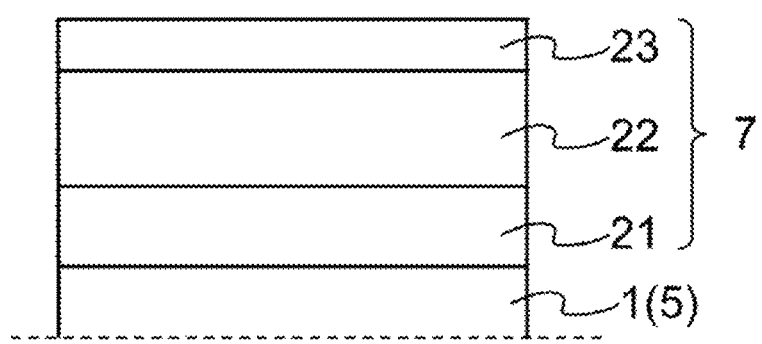
FIG. 1(b) is a schematic sectional view showing an external electrode 7b along an A-A surface in the electronic component shown in FIG. 1(a).

A sectional view of the external electrode in the electronic component of the present embodiment may include, for example, one shown in FIG. 1(b).

As shown in FIG. 1(b), the external electrode 7 has a layer 22 having an alloy (for example, a layer having an Ni—Fe based alloy).

The external electrode 7 may further include a layer 23 brought into contact with the layer 22 having the alloy. When the layer 23 exists, the layer 23 may be the outermost layer of the external electrode. Examples of the layer 23 may include a layer containing Sn (Sn-plating layer), and the like. In this case, jointability to the solder may be improved (in other words, "solder wettability" may be improved), when mounting is performed.

The external electrode may further include a layer 21 brought into contact with the layer 22 having the alloy. When the layer 21 exists, the layer 21 may be directly brought into contact with the component body 1 (typically 5). Examples of the layer 21 may include a layer containing Ag (more specifically, an Ag paste layer), and the like. In this case, contact between the component body 1 and the external electrode 7 may be improved. In the present embodiment, for example, when a layer containing Ag is provided as the layer 21, the dissolution into solder from the layer containing Ag can be prevented by the presence of the layer 22 having the alloy. In this case, the connection between the component body and the layer including Ag is good, and the connection reliability as the electronic component may also be good.

The thickness of the external electrode is not particularly limited, and, for example, may be in the range of 1 to 500 μm, 3 to 300 μm, or 5 to 20 μm.

The at least one first metal is selected from the group consisting of metals of Group 9 to Group 11 of the Periodic Table of the Elements, and the at least one second metal has a higher melting point than that of the at least one first metal.

When the layer having the alloy as described above is included, it is possible to effectively suppress the diffusion of metal atoms from the external electrode to the solder or solder joint portion, and thus it is possible to provide the electronic component capable of obtaining the high joint strength between the electronic component and the substrate.

The melting point can be obtained as a temperature of an endothermic peak in a differential scanning calorimeter (DSC). Specifically, it can be measured as a peak top in a crystal melting peak observed in DSC, for example, when a temperature is raised at 3° C./min under a nitrogen atmosphere. When a plurality of endothermic peaks are observed, the lowest temperature is defined as the melting point.

When the at least one first metal includes an alloy with two or more kinds of metals, the melting point of the "at least one first metal" indicates a melting point of the alloy including the two or more kinds of the metals. When the at least one second metal includes an alloy with two or more kinds of metals, the melting point of the "at least one second metal" indicates a melting point of the alloy including the two or more kinds of the metals.

The at least one first metal is selected, for example, from the group consisting of Ni, Co, Ag, and Cu. When the first metal as described above is used, the particularly good joint strength can be obtained between the electronic component and the substrate.

The at least one second metal is selected, for example, from the group consisting of W, Re, Os, Mo, Nb, Ir, Ru, Rh, Cr, Pt, Ti, Lu, Pd, Fe, and Co. When the second metal as described above is used, the particularly good heat resistance can be obtained between the electronic component and the substrate.

For example, the at least one first metal is selected from the group consisting of Ni, Co, Ag, and Cu, and the at least one second metal is selected from the group consisting of W, Re, Os, Mo, Nb, Ir, Ru, Rh, Cr, Pt, Ti, Lu, Pd, Fe, and Co. When the combination of the metals as described above is used, it is possible to more effectively suppress the diffusion of metal atoms from the external electrode to the solder or solder joint portion, and it is possible to provide the electronic component capable of obtaining the high joint strength between the electronic component and the substrate.

The at least one first metal is preferably Ni, Co, Ag, or Cu, more preferably Ni.

The at least one second metal is preferably W, Re, Os, Mo, Nb, Ir, Ru, Rh, Cr, Pt, Ti, Lu, Pd, Fe, or Co, more preferably Fe, Pd, or W.

For example, the at least one first metal is Ni, and the at least one second metal is selected from the group consisting of Fe, Pd, and W.

Preferably, the alloy included in the layer having the alloy is an Ni—Fe based alloy, an Ni—Pd based alloy, or an Ni—W alloy, and most preferably is an Ni—Fe based alloy.

In the layer 22 having the alloy, the concentration of the at least one second metal continuously changes in the thickness direction of the external electrode, and there is at least one first portion where the concentration of the at least one second metal increases and there is at least one second portion where the concentration of the at least one second metal decreases. The layer 22 having the alloy may be formed in a direction away from the surface of the component body.

In the present specification, the phrase "the concentration of at least one second metal continuously changes" expresses that, in a case where a plurality of the metals are included (that is, in a case where the number of the second metals included in the layer having the alloy is plural), it is enough that the concentration of one metal among the plurality of the metals continuously changes. The phrase "the concentration of the at least one second metal increases" expresses that, in a case where a plurality of metals are included, it is enough that the concentration of one metal among the plurality of the metals increases, and the phrase "the concentration of the at least one second metal decreases" expresses that, in a case where a plurality of metals are included, the concentration of one metal among the plurality of the metals decreases.

For example, if the external electrode includes a layer having an Ni—Fe based alloy, the Fe concentration continuously changes in the thickness direction of the external electrode, and there is at least one portion where the Fe concentration increases and there is at least one portion where the Fe concentration decreases (hereinafter, it may be referred to as the "layer having the Ni—Fe based alloy"). The layer having the Ni—Fe based alloy can be formed in a direction away from the surface of the component body.

In the present specification, in the layer 22 having the alloy, the alloy may contain a metal other than the first metal and the second metal as long as the effects of the present invention are not hindered. For example, when the alloy is an alloy including Ni and Fe (which may be sometimes referred to as "Ni—Fe based alloy"), metal atoms other than Ni and Fe may be included as long as the effects of the present invention are not hindered.

In the layer 22 having the alloy, the content of metal atoms other than the first metal and the second metal is not particularly limited, and is, for example, 10% by mass or less, specifically 1% by mass or less relative to the total mass of the alloy. The lower limit content of the metal atoms other than the first metal and the second metal may be 0% by mass relative to the total mass of the alloy.

For example, when the alloy is a Ni—Fe based alloy, the content of metal atoms other than Ni and Fe in the Ni—Fe based alloy is not particularly limited, and is, for example, 10% by mass or less, specifically 1% by mass % or less relative to the total mass of the Ni—Fe based alloy. The lower limit content of metal atoms other than Ni and Fe may be 0% by mass relative to the total mass of the Ni—Fe based alloy.

In one aspect, the alloy (for example, the Ni—Fe based alloy) does not include metal atoms other than the at least one first metal and the at least one second metal (e.g., Ni and Fe), except for unavoidable impurities. According to the present aspect, an external electrode having good heat resistance (particularly, a layer having the Ni—Fe based alloy) can be provided, and further, a better joint strength can be provided between the electronic component including the external electrode and the substrate.

In another aspect, the Ni—Fe based alloy may include atoms other than Ni and Fe, specifically, metal atoms such as Sn, Ag, Cu, Co, Ti, Ba, Mn, Ca, Sr, Na, K, Mg, and Al.

In the present specification, the layer 22 having the alloy is a layer including the at least one first metal and the at least one second metal, and may include a third ingredient other than the first metal and the second metal as long as the effects of the present invention are not hindered. For example, when the layer having the alloy is a "layer having an Ni—Fe based alloy", the layer is a layer including the "Ni—Fe based alloy", and may include a third ingredient other than the Ni—Fe based alloy as long as the effects of the present invention are not hindered.

Examples of the third ingredient may include S having an effect of reducing a stress of a coating film, C, O, Cl, P, B, and N atoms, and the like.

The content of the atoms as the third ingredient may be included, for example, in a range of 0 to 10% by mass, specifically in a range of 0 to 1% by mass relative to the total mass of the layer having the alloy.

In the layer 22 having the alloy in the present aspect, the alloy (for example, an Ni—Fe based alloy) may include other trace substances, for example, trace elements which may be unavoidably contained.

Figure 2A:
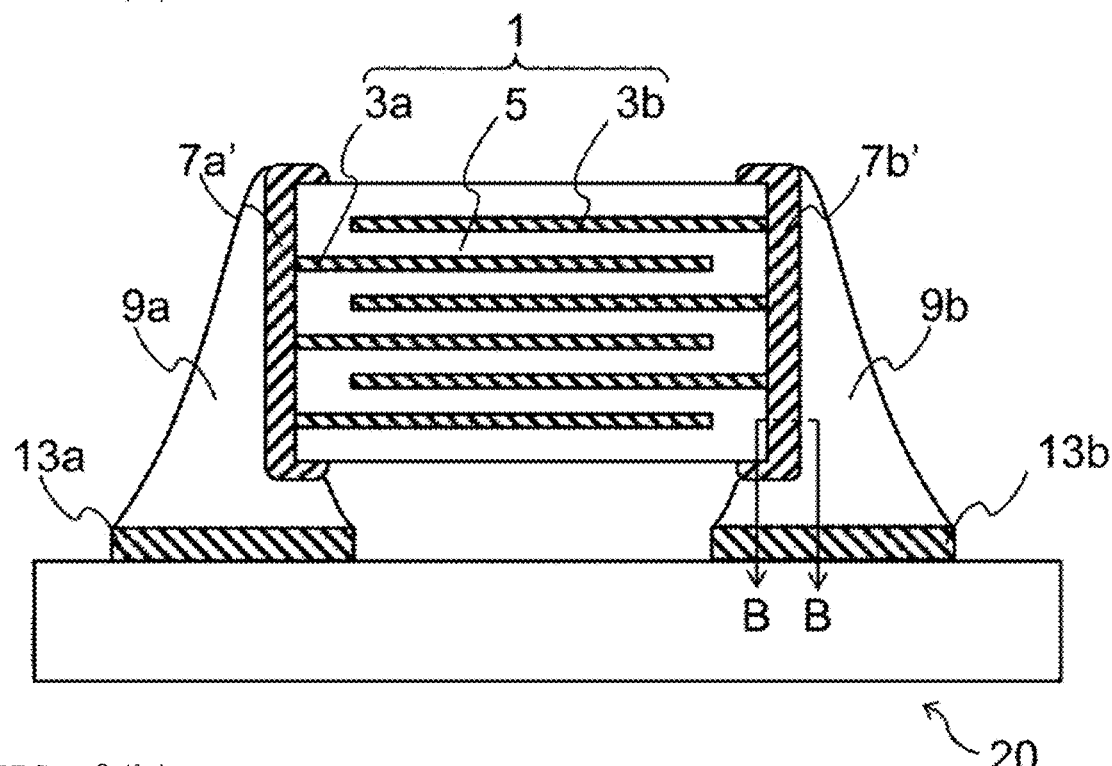
FIG. 2(a) is a schematic sectional view showing a mounting structure according to one aspect of the present invention.
Figure 2B:
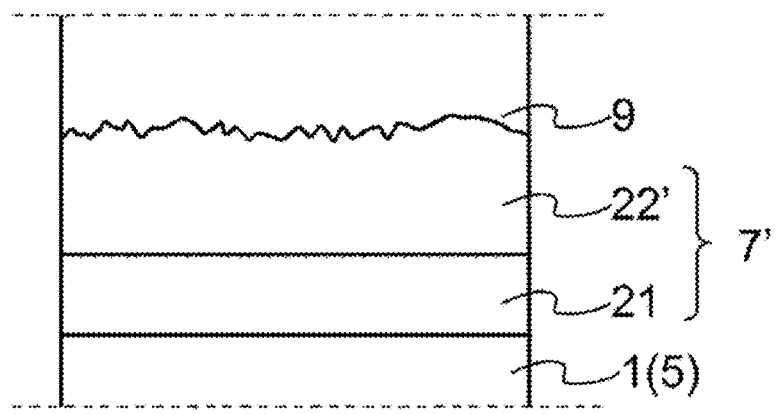
FIG. 2(b) is a schematic sectional view showing an external electrode 7b' along a B—B surface in the mounting structure shown in FIG. 2(a).

The electronic component of the present embodiment can be used for a mounting structure by mounting it on a substrate using solder. A typical example of the mounting structure is a mounting structure as illustrated in FIG. 2(*a*). In FIG. 2(*a*), a mounting structure 20 includes an electronic component and solder joint portions 9. In the mounting structure 20, the electronic component includes a component body 1 and external electrodes 7' provided on a surface of the component body. The component body 1 has internal electrodes 3 and dielectric portions (dielectric layers) 5.

The number of the external electrodes is not particularly limited, and a plurality of external electrodes can be provided. In FIGS. 2(*a*), 7*a*' and 7*b*' are provided as the external electrode 7'.

The solder joint portions 9 can be provided as 9*a* and 9*b*. The solder joint portion 9 joins the electronic component to a substrate 11, and specifically, directly joins an electrode portion 13 provided on the surface of the substrate 11.

The number of the electrode portions 13 is appropriately selected depending on the number of the electronic components, and may be typically two (13*a*, and 13*b*).

The sectional view of the external electrode 7' in the mounting structure of the present embodiment may be exemplified, for example, by FIG. 2(*b*). In FIG. 2(*b*), the external electrode has a layer 22' having an alloy (for example, a layer having an Ni—Fe based alloy).

As shown in FIG. 2(*b*), in the mounting structure of the present embodiment, the external electrode 7' may further have a layer 21, which is brought into contact with the layer 22' having the alloy. When the layer 21 exists, the layer 21 may be directly brought into contact with the component body 1 (typically 5). Examples of the layer 21 may include a layer containing Ag (Ag paste layer). In this case, the contact between the component body and the external electrode can be improved. The mounting structure of the present embodiment has the solder joint portion 9 which is brought into contact with the layer 22' having the alloy.

As shown in FIG. 2(*b*), in the mounting structure of the present embodiment, the interface between the layer 22' having the alloy (for example, a layer having an Ni—Fe based metal) and the solder joint portion 9 may be in an uneven state. This is formed due to the portions in which the concentration of the at least one second metal (for example, Fe) is increased and in which the concentration is decreased in the layer 22' having the alloy. Although the present invention is not limited to any theory, it is considered that this is caused because the portions having a low concentration of the at least one second metal are easily included in the solder joint portion 9. In the present embodiment, it is considered that the joint strength between the electronic component and the substrate is strengthened when such an interface shape is included.

The concentration of the at least one second metal in the layer having the alloy is a value measured using a scanning electron microscope (FE-SEM/EDX) (manufactured by Hitachi High-Technologies Corporation, FE-SEM: SU8230/EDX: 5060FQ). Specifically, the measurement is performed as follows: The layer having the alloy is cut in the thickness direction of the external electrode, and the section is polished. Thereafter, a weight of a metal element contained in the layer having an Ni—Fe-based alloy is measured using FE-SEM/EDX at an acceleration voltage of 3 kV. The concentration of the at least one second metal refers to a ratio of the weight of the second metal to the total weight of the first metal and the second metal contained in the external electrode. For example, when the alloy is an Ni—Fe-based alloy, the "Fe concentration" refers to a ratio of the weight of the Fe element to the total weight of the Ni element and the Fe element.

The concentration of the at least one second metal is measured as follows: A plurality of points are uniformly provided per unit thickness (specifically, 1.0 µm), and concentrations of the at least one second metal are sequentially measured from the side close to the outermost surface of the external electrode (that is, in a case of a horizontal axis of 0).

Figure 3:
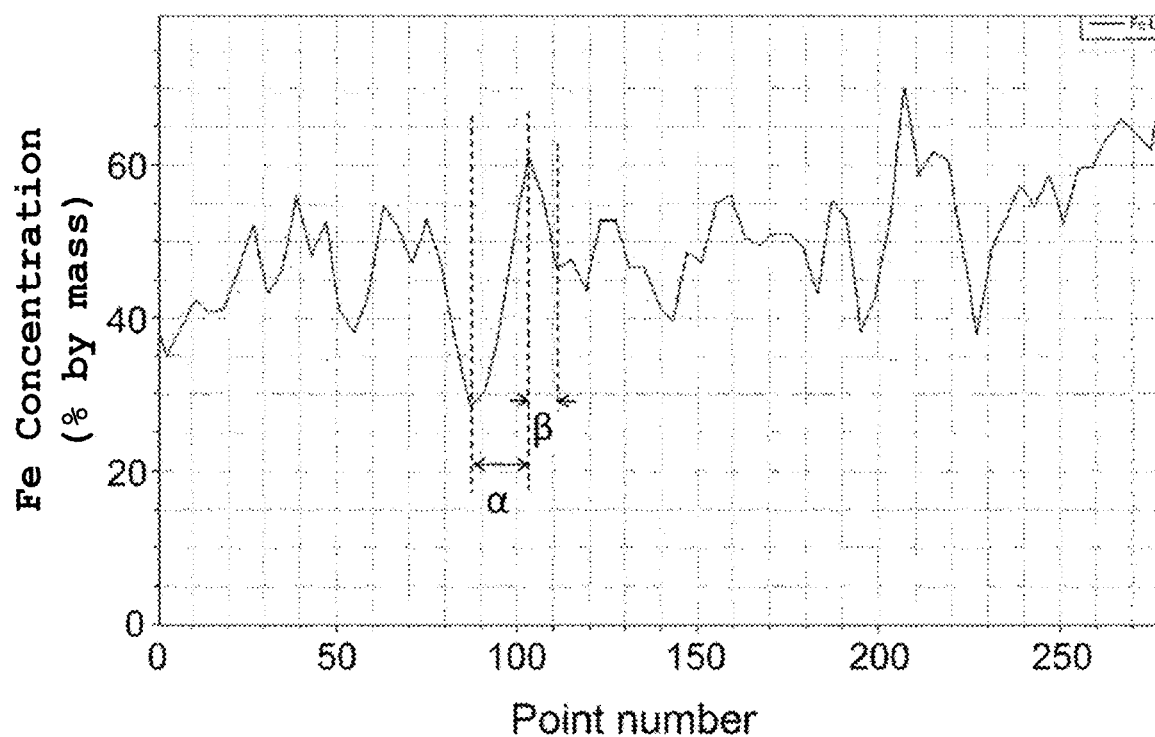
FIG. 3 is a graph showing variation in Fe concentration, with a point number on the horizontal axis and the Fe concentration on the vertical axis.

Based on the measured results, for example, a graph as illustrated in FIG. 3 can be formed. FIG. 3 shows Fe concentrations measured when an Ni—Fe based alloy is used as the alloy. In FIG. 3, the left side (when the horizontal axis is 0) indicates a side close to the outermost surface of the external electrode, and the right side indicates a side close to the component body. In FIG. 3, the horizontal axis is "Point number", which corresponds to the order of points at which the Fe concentration is measured, as described above. In FIG. 3, the vertical axis indicates the Fe concentrations. The Fe concentration is a value determined using FE-SEM/EDX as described above.

As shown in FIG. 3, the Fe concentrations continuously change between the minimum value and the maximum value. Note that "continuously" refers to a state in which there are the measurement points without scattering. For example, the Fe concentration is measured at 100 points or more (specifically, 130 points or more, 236 points in the example illustrated in FIG. 3) per unit thickness (per 1.0 µm), and the change between the Fe concentration measured at a certain measurement point and the Fe concentration measured at the adjacent measurement point can be 30% or less.

In FIG. 3, for example, an area indicated by α is a portion where the Fe concentration continuously increases from the minimum value to the maximum value ("portion where the Fe concentration increases"), and an area indicated by β is a portion where the Fe concentration continuously decreases from the maximum value to the minimum value ("portion where the Fe concentration decreases").

In the layer having the alloy, there is at least one first portion where the concentration of the at least one second metal increases in the thickness direction of the external electrode and there is at least one second portion where the concentration of the at least one second metal decreases. For example, when the layer having the alloy is a layer having an Ni—Fe based alloy, there is at least one portion where the Fe concentration increases and there is at least one portion where the Fe concentration decreases in the thickness direction of the external electrode.

In the layer having the alloy, there may be, for example, 1 to 100 of the first portions where the concentration of the at least one second metal increases per 1 μm in the thickness direction of the external electrode, specifically, there may be 1 to 70 of the portions per 1 μm, more specifically, there may be 10 to 50 portions per 1 μm.

For example, when the alloy is an Ni—Fe based alloy, there may be, for example, 1 to 100 of the first portions where the Fe concentration increases per 1 μm in the thickness direction of the external electrode, specifically, there may be 1 to 70 of the first portions per 1 μm, more specifically, there may be 10 to 50 of the first portions per 1 μm in the layer having the Ni—Fe based alloy.

In the layer having the alloy, there may be, for example, 1 to 100 of the second portions where the concentration of the at least one second metal decreases per 1 μm in the thickness direction of the external electrode, specifically 1 to 70 of the second portions per 1 μm, more specifically 10 to 50 of the second portions per 1 μm.

For example, when the alloy is an Ni—Fe based alloy, in the layer having the Ni—Fe based alloy, there may be, for example, 1 to 100 of the portions where the Fe concentration decreases per 1 μm in the thickness direction of the external electrode, specifically, there may be 1 to 70 of the portions per 1 μm, more specifically, there may be 10 to 50 of the portions per 1 μm.

When the layer having the alloy as described above (for example, a layer having an Ni—Fe based alloy) exists, the external electrode exhibits good heat resistance. As a result, when the electronic component of the present embodiment is mounted, the dissolution into solder of the layer having the alloy can be suppressed. Furthermore, when the layer having the alloy as described above exists, the joint strength between the electronic component and the substrate can be improved when the electronic component of the present embodiment is mounted on the substrate.

In one aspect, in the layer having the alloy (for example, a layer having an Ni—Fe based alloy), there are a plurality of layers laminated in the thickness direction of the external electrode, in which the concentration of the at least one second metal (for example, Fe) is different from the others. In the present aspect, the presence of the plurality of the layers whose concentrations of the at least one second metal is different from the others configures the first portions where the concentration of the at least one second metal increases and the second portions where the concentration of the at least one second metal decreases. The phrase "the concentration of the at least one second metal is different" expresses that in a case where a plurality of metals are included, it is enough that the concentration of one metal among the plurality of the metals is different.

Figure 4:
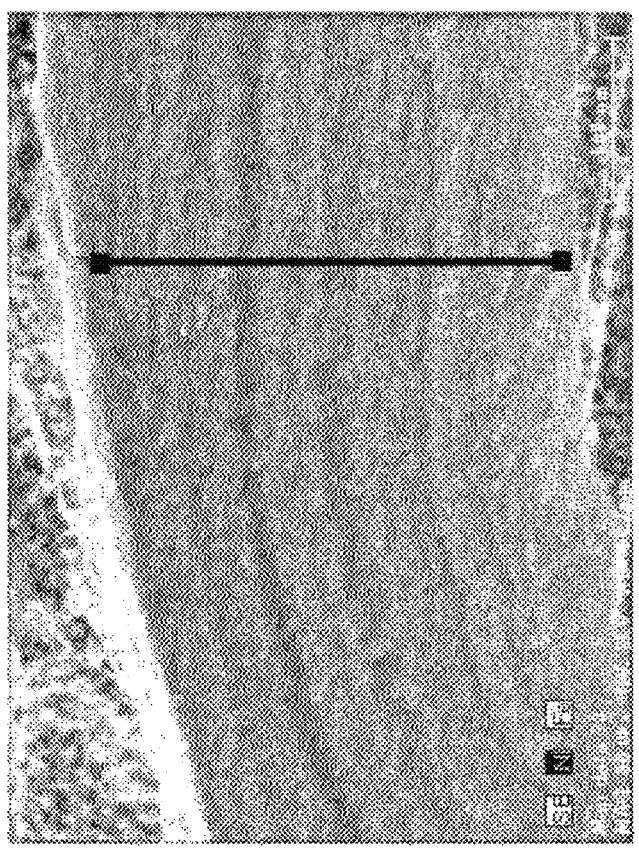
FIG. 4 is a sectional view showing a layer having an Ni—Fe based alloy contained in an external electrode obtained in Example 2.
Figure 5A:
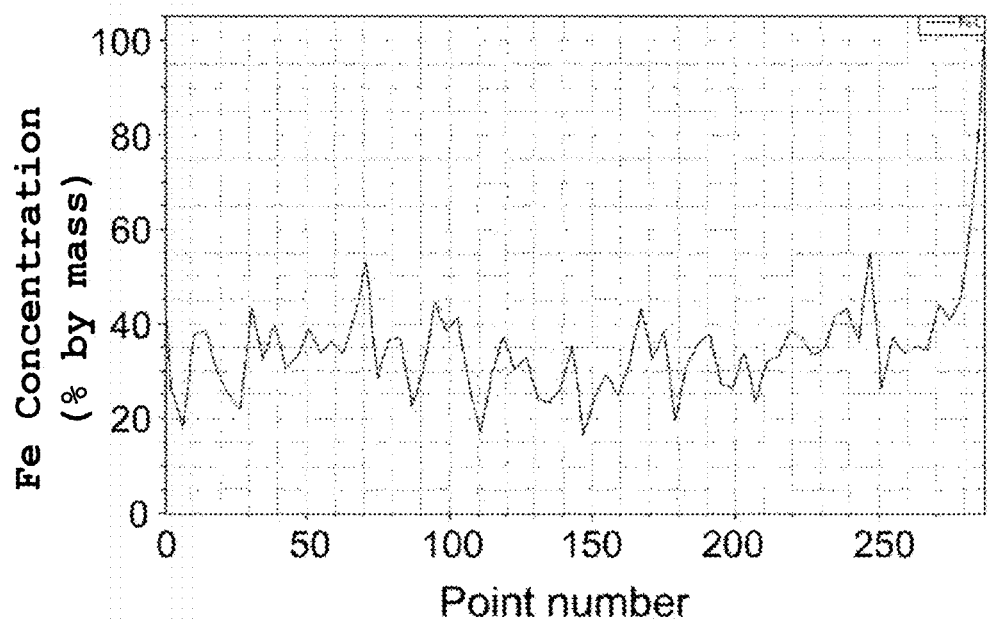
FIG. 5(a) is a graph showing variation in Fe concentration of a layer having an Ni—Fe based alloy contained in an external electrode obtained in Example 1.
Figure 5B:
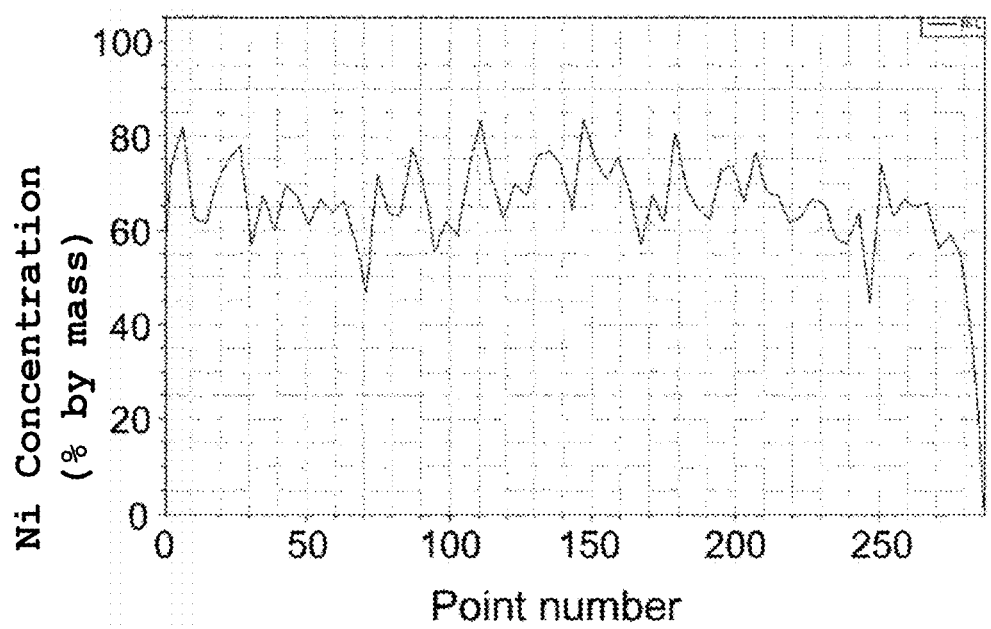
FIG. 5(b) is a graph showing variation in Ni concentration.
Figure 6A:
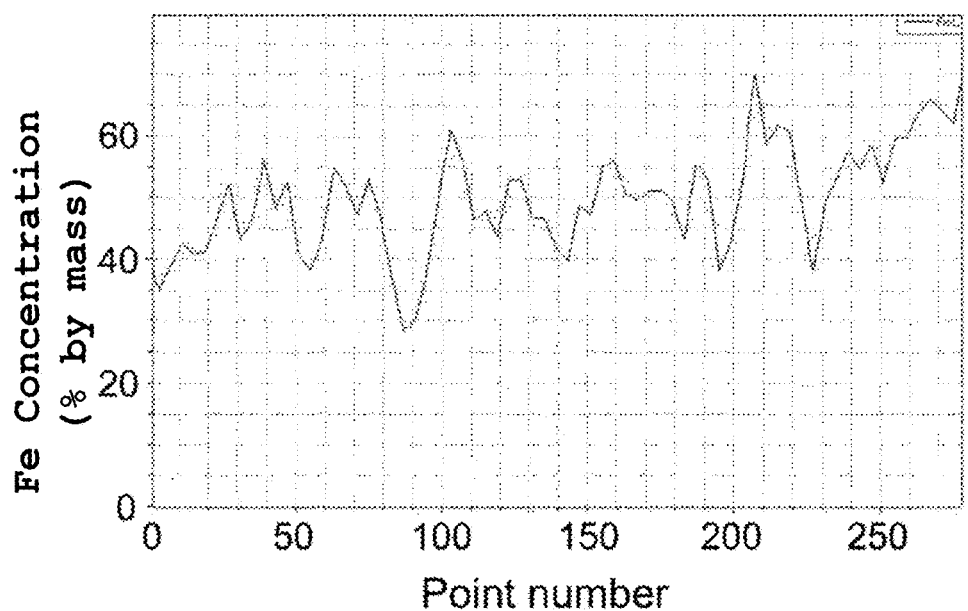
FIG. 6(a) is a graph showing variation in Fe concentration of a layer having an Ni—Fe based alloy contained in an external electrode obtained in Example 2.
Figure 6B:
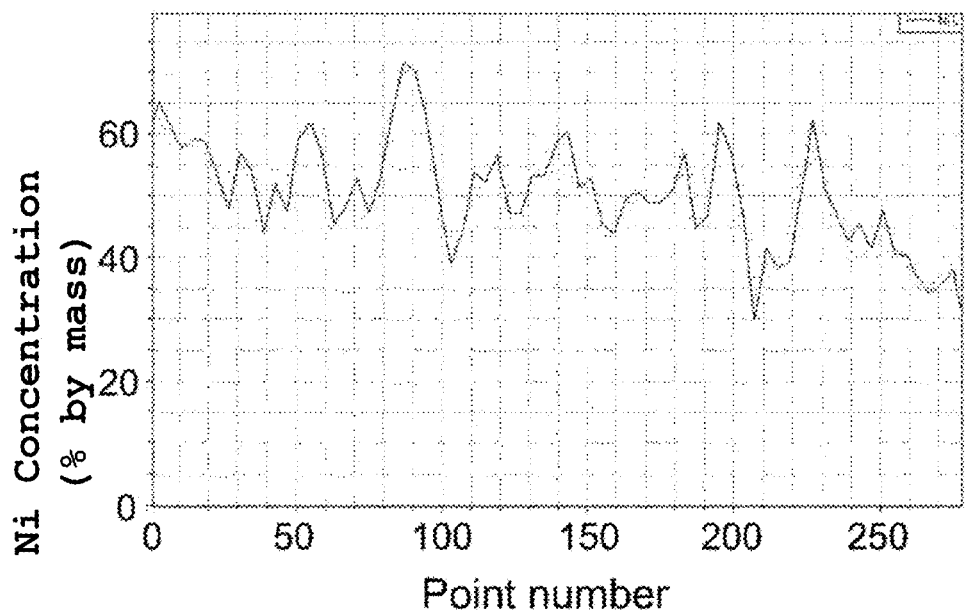
FIG. 6(b) is a graph showing variation in Ni concentration.

The above aspect will be explained in more detail with reference to FIG. 4. FIG. 4 is a sectional photograph showing a layer having an Ni—Fe based alloy, which is cut along the thickness direction of the external electrode. In FIG. 4, the right side is a side close to the component body.

FIG. 4 is an element mapping showing the section of the layer having the Ni—Fe-based alloy using FE-SEM/EDX. In FIG. 4, the color in the drawing is shown as lighter as the Fe concentration increases, and the color in the drawing is shown as darker as the Fe concentration decreases. The phrase "there are a plurality of the layers having different Fe concentrations" refers to a state in which the layers having different Fe concentrations are continuously present in a layered state in a direction substantially parallel to the surface of the component body, as shown in FIG. 4.

It can be considered that because there are a plurality of the layers having different concentrations of the at least one second metal, (for example, the layers having different Fe concentrations, as illustrated in FIG. 4), the heat resistance of a layer having a particularly high concentration of the at least one second metal (for example, the Fe concentration) is improved, and it is particularly advantageous in terms of the heat resistance. In addition, in the layer having the alloy (specifically, a layer having an Ni—Fe based alloy), the concentration of the at least one second metal (specifically, the Fe concentration) continuously changes, and thus when cracks are generated in the layer, the development of the cracks can be suppressed because physical properties are different between in the horizontal direction and in the vertical direction relative to the thickness.

In one aspect, in the layer having the alloy, there are a plurality of areas where the concentration of the at least one second metal is different from the others. For example, when the alloy is an Ni—Fe based alloy, there are a plurality of areas where the Fe concentration is different from the others in the layer having the Ni—Fe based alloy. In the present aspect, the presence of a plurality of the areas where the concentration of the at least one second metal is different from the others configures the first portions where the concentration of the at least one second metal increases and the second portions where the concentration decreases.

Figure 8:
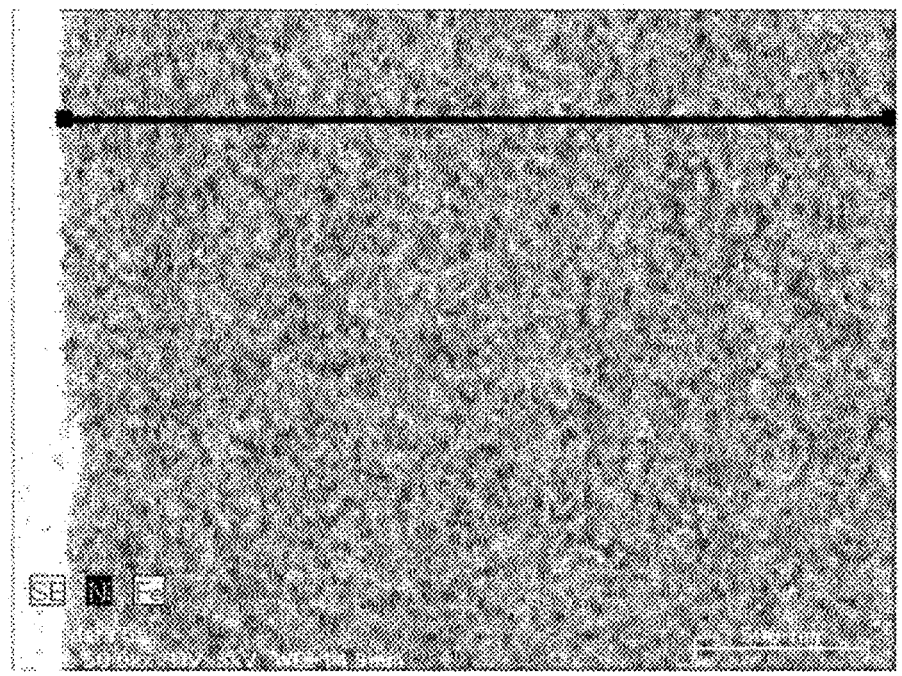
FIG. 8 is a sectional view showing a layer having an Ni—Fe based alloy contained in an external electrode obtained in Test Example 3.
Figure 9A:
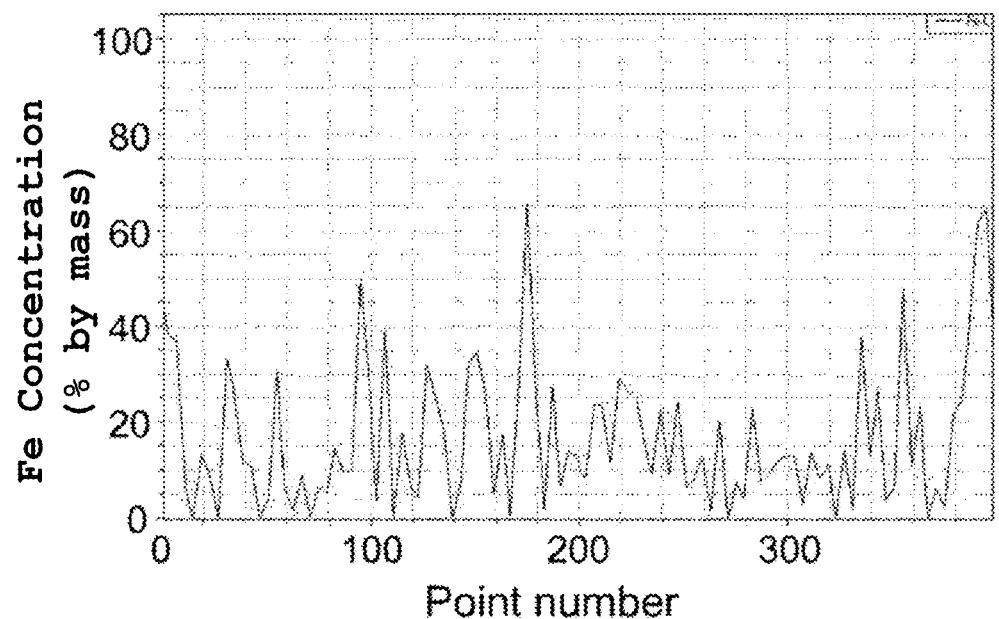
FIG. 9(a) is a graph showing variation in Fe concentration of a layer having an Ni—Fe based alloy contained in an external electrode obtained in Test Example 1.
Figure 9B:
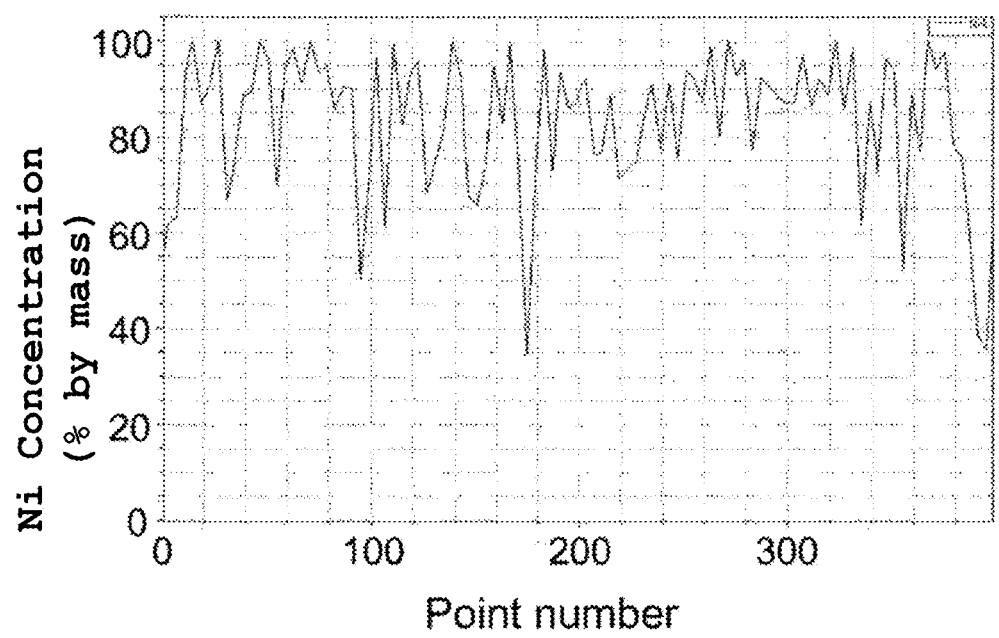
FIG. 9(b) is a graph showing variation in Ni concentration.
Figure 10A:
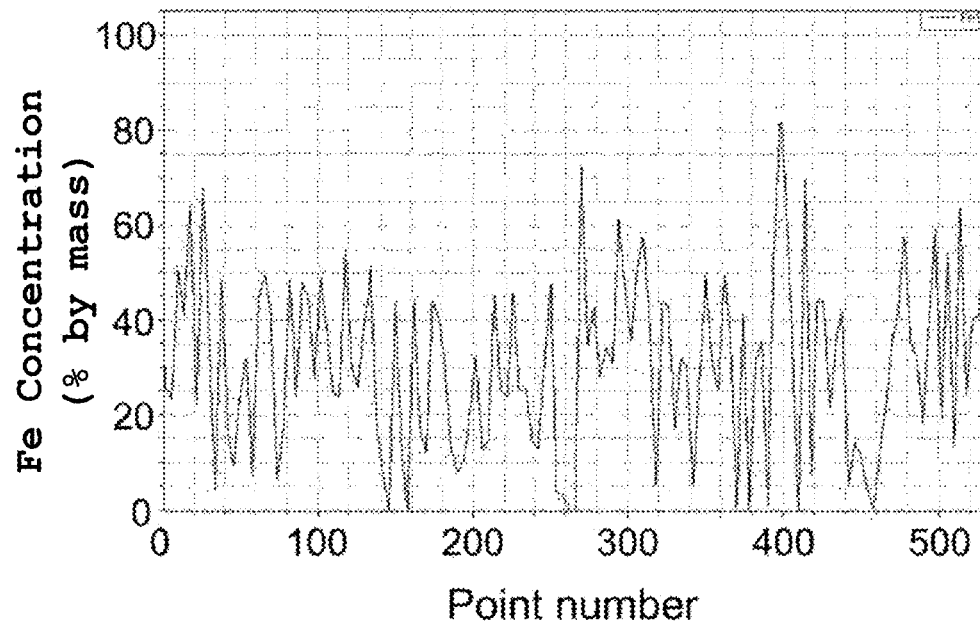
Figure 10B:
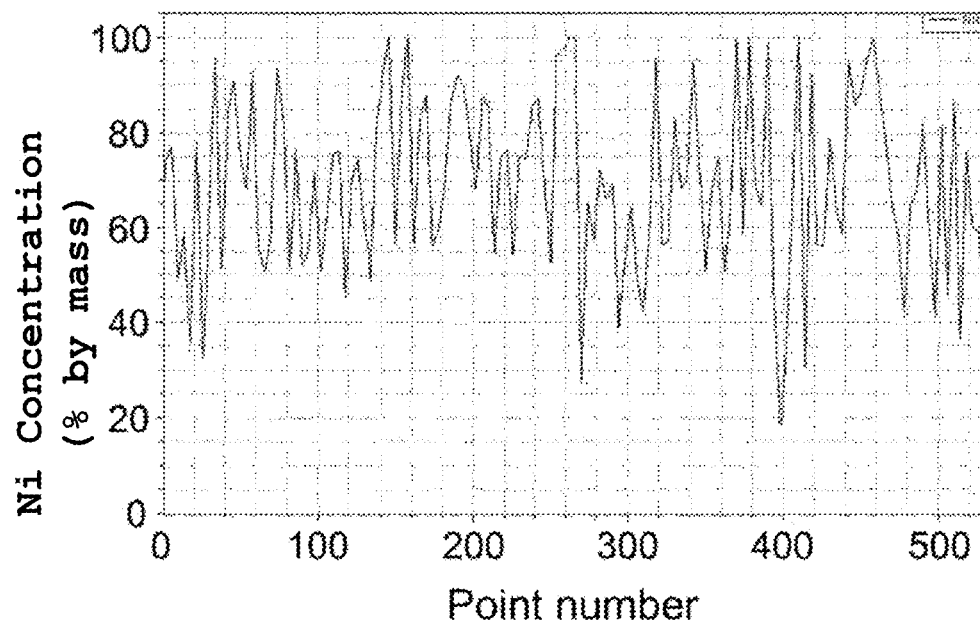
FIG. 10(b) is a graph showing variation in Ni concentration.
Figure 11A:
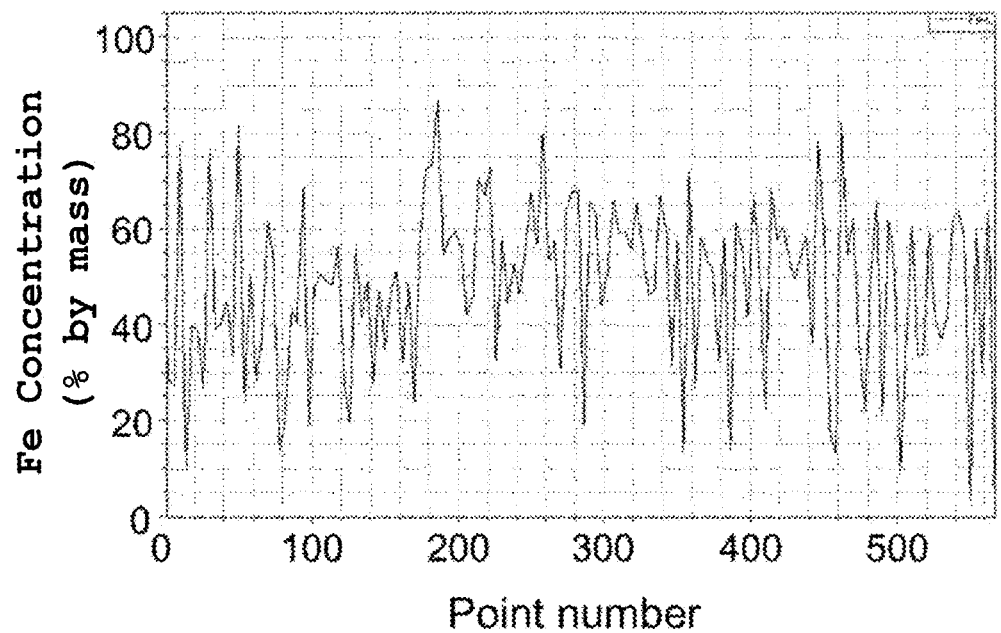
Figure 11B:
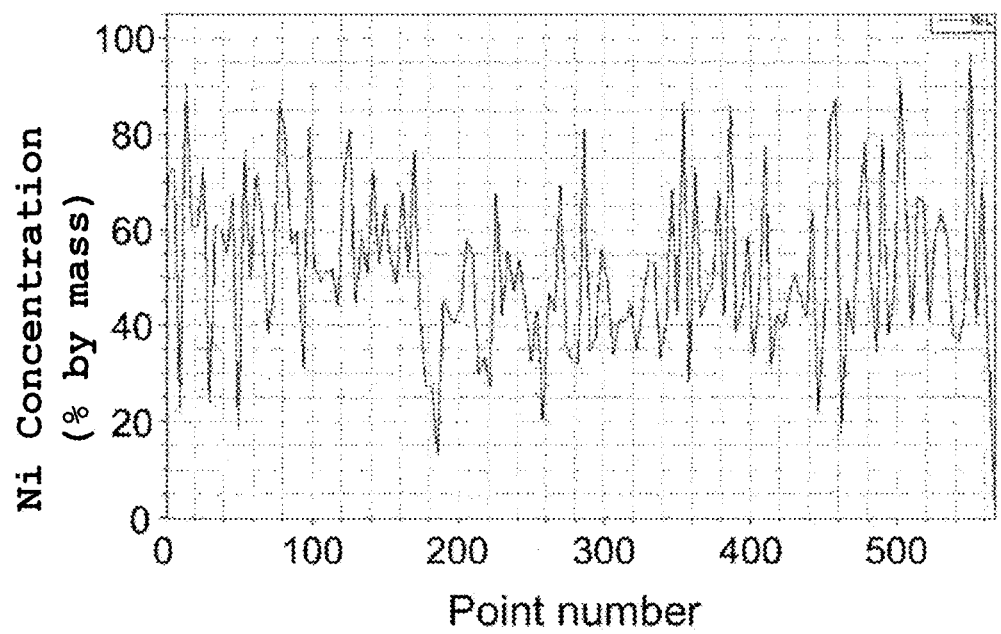
FIG. 11(b) is a graph showing variation in Ni concentration.

The aspect described above will be explained in more detail with reference to FIG. 8. FIG. 8 is a sectional photograph showing a layer having an Ni—Fe based alloy, which is cut along the thickness direction of the external electrode. In FIG. 8, the right side is a side of the external electrode of the component body.

FIG. 8 is an element mapping of a section of the layer having the Ni—Fe based alloy using FE-SEM/EDX. In FIG. 8, the color in the drawing is shown as lighter as the Fe concentration increases, and the color in the drawing is shown as darker as the Fe concentration decreases. The phrase "there are a plurality of the areas where the Fe concentration is different from the others" refers to a state in which, as shown in FIG. 8, there are the areas where the Fe concentration is high and there are the areas where the Fe concentration is low in a mixed state regardless of the direction.

Since there are a plurality of the areas where the concentration of the at least one second metal is different from the others (for example, as illustrated in FIG. 8, areas where the Fe concentration is different from the others), the heat resistance of the external electrode can be improved, and in particular, the adhesive strength between the electronic component of the present embodiment and the substrate can be improved. This is caused because the areas where the concentration of the at least one second metal (for example, the Fe concentration) is high and the areas where the concentration is low exist in the mixed state, and therefore when the solder joint portion is provided, an uneven area is easily formed at an interface between the solder joint portion and the external electrode. The "area where the concentration of the at least one second metal is different" expresses that when a plurality of metals are included (that is, when a plurality of the second metals are included in the layer having the alloy), it is enough that the concentration of one metal among the plurality of the metals is different.

In the layer having the alloy, preferably, there is at least one third portion where the concentration of the at least one first metal increases and there is at least one fourth portion where the concentration decreases, in the thickness direction of the external electrode. For example, when the alloy is an Ni—Fe based alloy, in the layer having the Ni—Fe based alloy, preferably, there is at least one portion where the Ni concentration increases and there is at least one portion where the Ni concentration decreases, in the thickness direction of the external electrode. Here, in the portion where the concentration of the at least one first metal (for example, the Ni concentration) increases and the portion where the concentration decreases, the portion where the concentration increases and the portion where the concentration decreases have the same meaning as the portion where the concentration increases and the portion where the concentration decreases in the concentration of the at least one second metal, respectively.

In the layer having the alloy, it is preferable that the concentration of the at least one first metal continuously changes in the thickness direction of the external electrode. For example, when the alloy is an Ni—Fe based alloy, it is preferable that the Ni concentration continuously changes in the thickness direction of the external electrode in the layer having the Ni—Fe based alloy.

In the layer having the alloy, there may be, for example, 1 to 100 of the third portions where the concentration of the at least one first metal increases per 1 µm in the thickness direction of the external electrode, specifically, 1 to 70 of the portions per 1 µm, more specifically, 10 to 50 of the portions per 1 µm. For example, when the alloy is an Ni—Fe based alloy, in the layer including the Ni—Fe based alloy, there may be, for example, 1 to 100 of the third portions where the Ni concentration increases per 1 µm in the thickness direction of the external electrode, specifically, there may be 1 to 70 of the third portions per 1 µm, more specifically, there may be 10 to 50 of the third portions per 1 µm.

In the layer having the alloy, there may be, for example, 1 to 100 of the fourth portions where the concentration of the at least one first metal decreases per 1 µm in the thickness direction of the external electrode, specifically 1 to 70 of the portions per 1 µm, more specifically 10 to 50 of the portions per 1 µm. For example, when the alloy is an Ni—Fe based alloy, in the layer including the Ni—Fe based alloy, there may be, for example, 1 to 100 of the portions where the Ni concentration decreases per 1 µm in the thickness direction of the external electrode, specifically, there may be 1 to 70 of the portions per 1 µm, more specifically, there may be 10 to 50 of the portions per 1 µm.

In the layer having the alloy, a ratio of the at least one second metal contained in the layer is preferably in a range of 1 to 99% by mass, and may be, for example, in a range of 15 to 99% by mass, in a range of 50 to 99% by mass, or in a range of 65 to 90% by mass. For example, the ratio may be in a range of 15 to 80% by mass. For example, when the alloy is an Ni—Fe based alloy, in a layer including the Ni—Fe based alloy, the ratio of Fe contained in the layer is preferably in a range of 1 to 99% by mass, may be in a range of 15 to 99% by mass, and may be in a range of 50 to 99% by mass, 65 to 90% by mass, or 70 to 90% by mass.

The ratio of the at least one second metal (for example, Fe) can be obtained using FE-SEM/EDX.
Specifically, the measurement is performed as follows: The layer having the alloy is cut in the thickness direction of the external electrode, and the section is polished. Thereafter, using FESEM/EDX, a weight of the metal element contained in the layer having the alloy is measured at an acceleration voltage of 3 kV. The analysis can be performed, for example, by providing a region of 2 µm in length and 2 µm in width and analyzing metal elements contained in the region. The concentration of the at least one second metal refers to a ratio of a weight of the at least one second metal to a total weight of the at least one first metal and the at least one second metal (that is, the total weight of the first metal and the second metal contained in the external electrode). For example, when the alloy is an Ni—Fe based alloy, the "Fe concentration" refers to a ratio of the weight of the Fe element to the total weight of the Ni element and the Fe element.

When the at least one second metal contains a plurality of metals, a "ratio of the at least one second metal" refers to a ratio of the total amount of the second metals contained in the layer having the alloy.

The thickness of the layer having the alloy (for example, a layer having an Ni—Fe-based alloy) is not particularly limited, and may be, for example, in a range of 1 to 30 µm, in a range of 1 to 15 µm, or in a range of 1 to 8 µm. When the layer has such a thickness, the layer having the alloy can have the good heat resistance, and further, when the electronic component of the present embodiment is jointed to a substrate using solder, the adherence between the electronic component and the substrate can be improved.

The external electrode may have other layers in addition to the layer having the alloy. That is, the external electrode may have a plurality of layers.

When the external electrode has another layer, the other layer and the layer having the alloy are preferably laminated in the thickness direction of the external electrode.

Examples of the material configuring the other layer may include at least one metal selected from Ag, Cu, Sn, Au, Ti, Cr, Mo, Ta, Zr, Nb, W, Al, Co, Ni, Fe, and Pd, and alloys thereof.

In one aspect, the external electrode may have a plurality of layers having the alloy. Specifically, the external electrode may have a plurality of layers having an Ni—Fe based alloy.

A method for forming the external electrode is not particularly limited as long as it is a method capable of appropriately joining the external electrode to the component body, and examples thereof may include a method including coating of a conductive paste, a plating method (for example, an electrolytic plating method or an electroless plating method), sputtering, vapor deposition, and the like. The above method can be performed using a method commonly used.

In one aspect, a layer formed directly on the surface of the component body can be provided by coating a conductive paste, and a layer formed on the layer obtained by coating the conductive paste described above can be provided by a plating method, specifically, an electrolytic plating method.

The layer having the alloy (for example, a layer having an Ni—Fe based alloy) can be formed by a plating method, specifically, can be formed by an electrolytic plating method.

According to the aspect described above, it is easy to form the portions where the concentration of the second metal continuously changes, for example, layers or areas where the concentration of the second metal is different from the others.

Examples of the electrolytic plating method may include a barrel plating method, a rack plating method, and the like.

In the electrolytic plating method, for example, a voltage value to be applied to an object to be plated is varied.

Although there are no particular limitations, for example, the barrel plating method can be suitable for formation of the layer having the Ni—Fe based alloy in which a plurality of layers whose Fe concentration is different from the others, the layers being laminated in the thickness direction of the external electrode, and the rack plating method can be suitable for formation of the layer having the Ni—Fe based alloy in which a plurality of areas whose Fe concentration is different from the others.

The electronic component of the present embodiment can be mounted on a substrate (mounting substrate) to form a mounting structure.

Embodiment 2

Hereinafter, as Embodiment 2, a mounting structure will be explained. The same explanations as in Embodiment 1 apply to this embodiment unless otherwise specified.

The mounting structure of the present embodiment is a mounting structure in which in which an electronic component is mounted on a substrate having an electrode portion, wherein the electronic component includes: a component body; and an external electrode on a surface of the component body, the external electrode includes a layer having an alloy of at least one first metal and at least one second metal, the at least one first metal is selected from the group consisting of metals of Group 9 to Group 11 of the Periodic Table of the Elements, the at least one second metal has a melting point higher than a melting point of the at least one first metal, in the layer having the alloy, a concentration of the at least one second metal continuously changes in a thickness direction of the external electrode, and at least one first portion of the layer having the alloy has the concentration of the at least one second metal increasing in the thickness direction, and at least one second portion of the layer having the alloy has the concentration of the at least one second metal decreasing in the thickness direction, and the external electrode is joined to the electrode portion of the substrate through a solder joint portion.

Preferably, the alloy is an Ni—Fe based alloy, an Fe concentration continuously changes in a thickness direction of the external electrode, the at least one first portion has the Fe concentration increasing and the at least one second portion has the Fe concentration decreasing.

In the present embodiment, the substrate is not particularly limited, and substrates commonly used can be used. Examples of the substrate may include alumina, epoxy glass, glass, Si wafer, ferrite wafer, and the like.

The electrode portion provided on the surface of the substrate is not particularly limited, and electrode portions commonly used can be used. The electrode portion can be formed of, for example, a conductive material such as Ni, Cu, Ag, Sn, Au, or Pd, or optionally preflux, or the like.

In the mounting structure of the present embodiment, there is a solder joint portion between the external electrode and the electrode portion. The solder joint portion may be substantially formed of solder, and may further include at least one metal atom derived from the external electrode contained in the electronic component of the present embodiment.

In the present embodiment, the electronic component of Embodiment 1 is used. In the present embodiment, the external electrode has a layer having an alloy (for example, a layer having an Ni—Fe based alloy). When the layer having the alloy exists, the dissolution into solder of the layer having the alloy can be suppressed when the mounting structure of the present embodiment is used for a long period of time and/or in a high temperature environment.

In the present embodiment, when the external electrode includes the layer having the alloy (for example, a layer having an Ni—Fe based alloy) and a layer brought into direct contact with the component body (for example, a layer containing Ag), the dissolution into solder from the layer containing Ag can also be prevented. As a result, the connection reliability in the mounting structure can also be improved.

In the mounting structure of the present embodiment, the layer having the alloy (for example, a layer having an Ni—Fe based alloy) in the external electrode can be joined to the solder joint portion. In the mounting structure of the present embodiment, there may be an uneven area at the interface between the layer having the alloy in the external electrode and the solder joint portion. It is considered that this is caused because a part of the layer having the alloy may be included as a part of the solder joint portion at the time of forming the solder joint portion.

The solder joint portion can be formed by a general method, and, for example, may be formed by reflowing using a solder paste.

In the present embodiment, the solder is not particularly limited, and solder commonly used can be used. Examples of the solder may include Sn—Ag based alloy, Sn—Ag—Cu based alloy (SAC), Sn—Zn—Bi based alloy, Sn—Cu based alloy, Sn—Ag—In—Bi based alloy, Sn—Zn—Al based alloy, Sn—Sb based alloy, Sn—Pb based alloy, and the like.

Preferably, in the vicinity of the interface between the external electrode and the solder joint portion, there is an alloy derived from the external electrode (for example, the external electrode included in the electronic component of Embodiment 1) and the metal atoms forming the solder joint portion (sometimes referred to as "intermetallic compound" in the present specification). When there is such an intermetallic compound, the electronic component and the substrate, specifically, the external electrode and the electrode portion can be more firmly joined to each other.

For example, when, as the solder, an alloy containing Sn, specifically, an Sn—Ag based alloy, an Sn—Ag—Cu based alloy, an Sn—Zn—Bi based alloy, an Sn—Cu based alloy, an Sn—Ag—In—Bi based alloy, an Sn—Zn—Al based alloy, an Sn—Sb based alloy, an Sn—Pb based alloy, or the like, is used, and Fe is contained in the layer having the alloy in the external electrode, there is an $FeSn_2$ based alloy as the intermetallic compound. When there is the $FeSn_2$ based alloy, the diffusion of metal atoms from the external electrode to the solder joint portion can be more effectively suppressed, and the electronic component and the substrate, specifically, the external electrode and the electrode portion can be more firmly joined to each other.

For example, when, as the solder, an alloy containing Sn, specifically, an Sn—Ag based alloy, an Sn—Ag—Cu based alloy, an Sn—Zn—Bi based alloy, an Sn—Cu based alloy, an Sn—Ag—In—Bi based alloy, an Sn—Zn—Al based alloy, an Sn—Sb based alloy, an Sn—Pb based alloy, or the like, is used, and Ni is contained in the layer having the alloy in the external electrode, there is an $Ni_3Sn_4$ based alloy as the intermetallic compound. When there is the $Ni_3Sn_4$ based alloy, the diffusion of metal atoms from the external electrode to the solder joint portion can be more effectively suppressed, and the electronic component and the substrate, specifically, the external electrode and the electrode portion can be more firmly joined to each other.

For example, when, as the solder, an alloy containing Sn, specifically, an Sn—Ag based alloy, an Sn—Ag—Cu based alloy, an Sn—Zn—Bi based alloy, an Sn—Cu based alloy, an Sn—Ag—In—Bi based alloy, an Sn—Zn—Al based alloy, an Sn—Sb based alloy, an Sn—Pb based alloy, or the like, is used, and Fe and Ni are contained in the layer having the alloy in the external electrode, there are an $FeSn_2$ based alloy and an $Ni_3Sn_4$ based alloy as the intermetallic compounds. When there are the $FeSn_2$ based alloy and the $Ni_3Sn_4$ based alloy, the diffusion of the metal atoms from the external electrode to the solder joint portion can be more effectively suppressed, and the electronic component and the substrate, specifically, the external electrode and the electrode portion can be more firmly joined.

For example, when, as the solder, an alloy containing Sn and Cu, specifically, an Sn—Ag—Cu based alloy, an Sn—Cu based alloy, or the like, is used, and Ni is contained in the layer having the alloy in the external electrode, there is a $(Cu,Ni)_6Sn_5$ based alloy as the intermetallic compound. When there is the $(Cu,Ni)_6Sn_5$ based alloy, the diffusion of metal atoms from the external electrode to the solder joint portion can be more effectively suppressed, and the electronic component and the substrate, specifically, the external electrode and the electrode portion can be more firmly joined to each other.

The $(Cu,Ni)_6Sn_5$ refers to the presence of Cu and Ni to Sn in a ratio of 6:5.

The thickness of the layer having the intermetallic compound is not particularly limited, and may be, for example, in a range of 0.01 to 20 μm.

In one aspect, the thickness of the layer having the $FeSn_2$ based alloy is not particularly limited, and may be, for example, in a range of 0.01 to 20 μm.

EXAMPLE

Hereinafter, the present invention will be specifically explained with reference to Examples, but the present invention is not limited to these Examples.

Example 1

The chip-shaped ceramic laminate was immersed in a paste in which Ag powder and glass were mixed, and then pulled it up to attach the paste. Thereafter, firing was performed at 760° C. to form a composite layer containing Ag and glass on the surface of the ceramic laminate.

After forming the composite layer, a layer having an Ni—Fe based alloy was formed according to the following Method (A1-1) using a plating solution containing an iron salt (iron sulfate heptahydrate: 28 g/L), nickel salts (nickel sulfate hexahydrate: 250 g/L, and nickel chloride hexahydrate: 40 g/L), a buffer (boric acid: 30 g/L), a brightener (saccharin sodium dihydrate: 2 g/L), and an additive (malonic acid: 5.2 g/L).

Method (A1-1)

A layer having an Ni—Fe based alloy was formed according to a barrel plating method. Specifically, an object to be processed and a metal for ensuring conduction were put into a barrel-type plating apparatus, and the processing was performed at 10 A (an average current density of 0.29 A/dm$^2$) for 60 minutes while a voltage value was varied in a range of 5 to 15 V.

After the layer having the Ni—Fe based alloy was formed, a plating layer of Sn was formed using a plating solution containing an Sn salt, a complexing agent, and an additive according to Method (A1-2).

Method (A1-2)

An Sn layer was formed according to a barrel plating method. Specifically, an object to be processed and a metal for ensuring conduction were put into a barrel-type plating apparatus and the processing was performed at 6 A for 75 minutes.

As described above, an electronic component having an external electrode was produced.

Example 2

An electronic component having an external electrode was produced in the same manner as in Example 1 except that the concentration of the iron salt was changed to 56 g/L of iron sulfate heptahydrate in the formation of the plating layer of the Ni—Fe based alloy.

Example 3

An electronic component having an external electrode was produced in the same manner as in Example 1 except that the concentration of the iron salt was changed to 97 g/L of iron sulfate heptahydrate in the formation of the plating layer of the Ni—Fe based alloy.

Example 4

An electronic component having an external electrode was produced in the same manner as in Example 1 except that the concentration of the iron salt was changed to 117 g/L of iron sulfate heptahydrate in the formation of the plating layer of the Ni—Fe based alloy.

Test Example 1

A layer having an Ni—Fe based alloy was formed on a Cu plate by the following Method (A4-1) using a plating solution containing an iron salt (iron sulfate heptahydrate: 28 g/L), nickel salts (nickel sulfate hexahydrate: 250 g/L, and nickel chloride hexahydrate: 40 g/L), a buffer (boric acid: 30 g/L), a brightener (saccharin sodium dihydrate: 2 g/L), and an additive (malonic acid: 5.2 g/L).

Method (A4-1)

According to a rack plating method, processing was performed at 1.3 A (an average current density of 4.0 A/dm$^2$) for 4 minutes and 20 seconds while the voltage value was varied within a range of 2.0 to 2.6 V.

After the layer having the Ni—Fe based alloy was formed, a plating layer of Sn was formed using a plating solution containing an Sn salt, a complexing agent, and an additive according to Method (A4-2).

Method (A4-2)

Processing was performed at 0.085 A (an average current density of 0.25 A/dm$^2$) for 40 minutes according to a rack plating method.

As described above, a component having a layer having an Ni—Fe based alloy and an Sn layer was prepared.

Test Example 2

A component including a layer having an Ni—Fe based alloy and an Sn layer was produced in the same manner as in Test Example 1 except that the concentration of the iron salt was changed to 56 g/L of iron sulfate heptahydrate in the formation of the plating layer of the Ni—Fe based alloy.

Test Example 3

A component including a layer having an Ni—Fe based alloy and an Sn layer was produced in the same manner as in Test Example 1 except that the concentration of the iron salt was changed to 97 g/L of iron sulfate heptahydrate in the formation of the plating layer of the Ni—Fe based alloy.

The electronic components formed in Examples 1 to 4 and the components obtained in Test Examples 1 to 3 were each cut, and the section thereof was polished. Thereafter, the sections were analyzed as follows:

<Analysis Method of Section>

Analytical Instrument: a scanning electron microscope (FE-SEM/EDX)

Manufactured by Hitachi High-Technologies Corporation FE-SEM:SU8230/EDX:5060FQ

Acceleration Voltage: 3 kV

The analysis of the section was performed with the number, shown in the following Table, of points.

Based on the results of the above analysis, the analysis results of the Fe ratio and the Ni ratio in Examples 1 to 4 are shown in FIG. 5(a), FIG. 5(b), FIG. 6(a), FIG. 6(b), FIG. 7(a), FIG. 7(b), FIG. 12(a), and FIG. 12(b), respectively, and the analysis results of the Fe ratio and the Ni ratio in Test Examples 1 to 3 are shown in FIG. 9(a) and FIG. 9(b), FIG. 10(a), FIG. 10(b), FIG. 11(a), and FIG. 11(b), respectively. In addition, the number of portions where the Fe concentration increased was determined from the analysis results. The number of the portions where the Fe concentration increased is described in the following Table. The number of the "portions where the Fe concentration increased" is a value obtained by counting portions in which the Fe concentration once decreased and then increased.

TABLE 1

| | the number of points provided per 1 μm | the number of portions where Fe concentration increases |
|---|---|---|
| Example 1 | 135 | 11 |
| Example 2 | 197 | 14 |
| Example 3 | 135 | 11 |
| Example 4 | 197 | 15 |
| Test Example 1 | 236 | 17 |
| Test Example 2 | 236 | 18 |
| Test Example 3 | 236 | 22 |

<Ratio of Fe in Layer Having Ni—Fe Based Alloy>

The content of the Fe element to the total mass of the Fe element and the Ni element contained in the layer having the Ni—Fe based alloy was determined. The ratio of the Fe was obtained in a manner in which an analysis region of 2 μm in length or more and 2 μm in width or more in a section of the layer having the Ni—Fe based alloy was provided, the mass of the Fe element and the mass of the Ni element contained in the region were measured using EDX, and calculation was performed based on the measurement values. The conditions of EDX were the same as those in the section analysis method described above.

The analysis results of the sections of the layers having the Ni—Fe based alloy obtained in Examples 1 to 4 and Test Examples 1 to 3 are shown in the following Table.

TABLE 2

| | Fe:Ni (mass ratio) in layer having Ni—Fe based alloy |
|---|---|
| Example 1 | 36:64 |
| Example 2 | 50:50 |
| Example 3 | 70:30 |
| Example 4 | 80:20 |
| Test Example 1 | 18:82 |
| Test Example 2 | 30:70 |
| Test Example 3 | 50:50 |

Figure 12A:
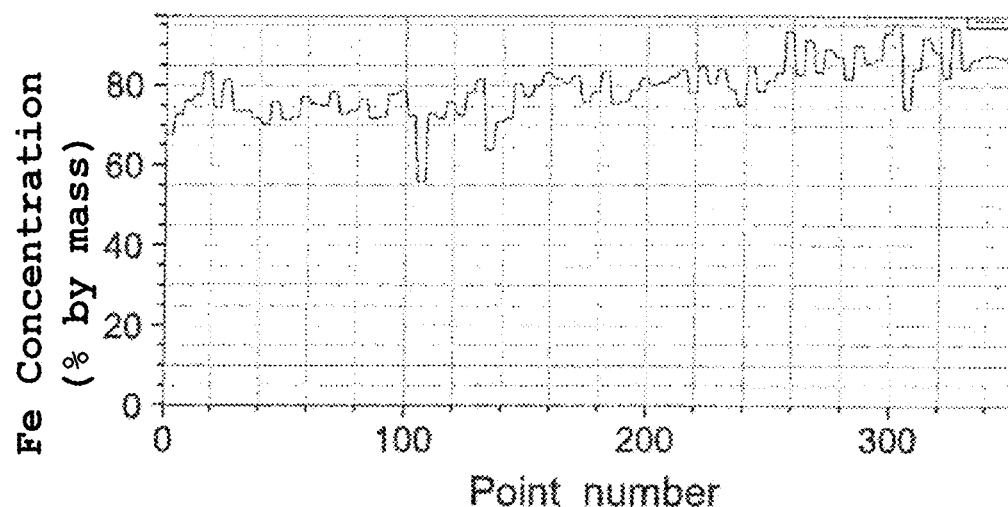
FIG. 12(a) is a graph showing variation in Fe concentration of a layer having an Ni—Fe based alloy contained in an external electrode obtained in Example 4.
Figure 12B:
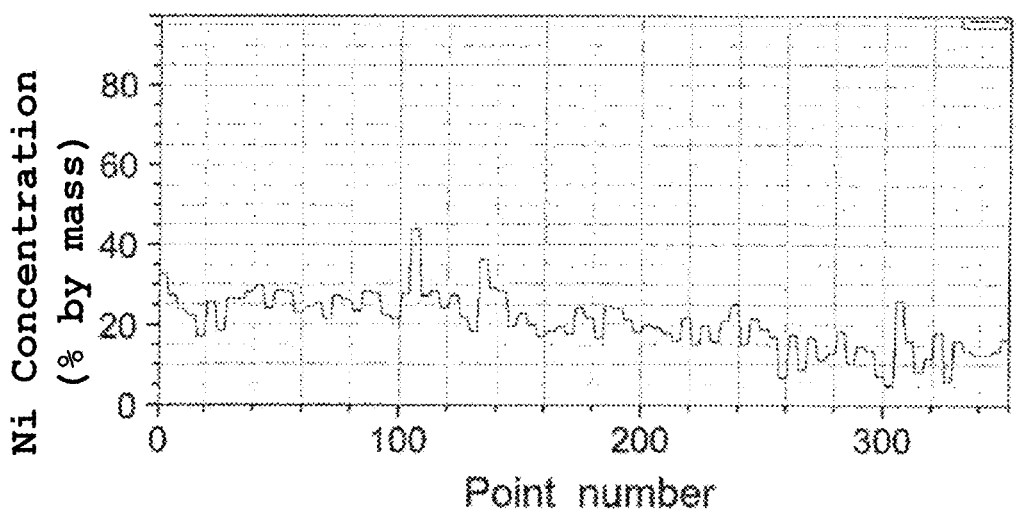
FIG. 12(b) is a graph showing variation in Ni concentration.

FIG. 4 shows a sectional view (magnification: 50,000 times) of the layer having the Ni—Fe based alloy obtained in Example 2, and FIG. 8 shows a sectional view (magnification: 50,000 times) of the layer having the Ni—Fe based alloy obtained in Test Example 3. FIGS. 6 (a) and (b) show the results of the Fe concentrations and the Ni concentrations measured at points provided along the horizontal line illustrated in FIG. 4, and FIGS. 11 (a) and (b) show the results of the Fe concentrations and the Ni concentrations measured at points provided along the horizontal line illustrated in FIG. 8. FIGS. 12(a) and (b) show the results of the Fe concentrations and the Ni concentrations measured at points provided in the sectional view of the layer having the Ni—Fe based alloy obtained in Example 4, in the same manner as in FIG. 4. In Examples 1 to 4 and Test Examples 1 to 3, it was confirmed that the layer having the Ni—Fe based alloy was formed wherein the Fe concentration continuously changed, and the portion where the Fe concentration increased and the portion where the concentration decreased respectively existed in the number of at least one.

Comparative Example 1

A ceramic laminate was immersed in a paste in which Ag powder and glass were mixed, and then pulled it up to attach the paste. Thereafter, firing was performed at 760° C. to form a composite layer containing Ag and glass on the surface of the ceramic laminate.

After forming the composite layer, an Ni layer was formed using a plating solution containing nickel salts (nickel sulfate: 240 g/L, and nickel chloride: 45 g/L) and a buffer (boric acid, 30 g/L) according to the following Method (B1-1).

Method (B1-1)

Processing was performed at 0.17 A (an average current density of 0.50 A/dm$^2$) for 30 minutes according to a barrel plating method.

After the Ni layer was formed, a plating layer of Sn was formed using a plating solution containing an Sn salt, a complexing agent, and an additive according to Method (B1-2).

Method (B1-2)

An Sn layer was formed according to a barrel plating method. Specifically, an object to be processed and a metal for ensuring conduction were put into a barrel-type plating apparatus and the processing was performed at 6 A for 75 minutes.

As described above, an electronic component having an external electrode was produced.

Comparative Example 2

A ceramic laminate was immersed in a paste in which Ag powder and glass were mixed, and then pulled it up to attach the paste. Thereafter, firing was performed at 760° C. to form a composite layer containing Ag and glass on the surface of the ceramic laminate.

After forming the composite layer, an Fe layer was formed using a plating solution containing an iron salt (ferrous chloride: 240 g/L) and a conductive agent (potassium chloride: 180 g/L) according to the following Method (B2-1).

Method (B2-1)

Processing was performed at 1.2 A (an average current density of 3.5 A/dm$^2$) for 3 minutes according to a barrel plating method.

After the Fe layer was formed, an Ni layer was formed using a plating solution containing nickel salts (nickel sulfate: 240 g/L, and nickel chloride: 45 g/L) and a buffer (boric acid, 30 g/L) according to the following Method (B2-2).

Method (B2-2)

Processing was performed at 0.17 A (an average current density of 0.50 A/dm$^2$) for 10 minutes according to a rack plating method.

After the Ni layer was formed, a plating layer of Sn was formed using a plating solution containing an Sn salt, a complexing agent, and an additive according to Method (B2-3).

Method (B2-3)

An Sn layer was formed according to a barrel plating method. Specifically, an object to be processed and a metal for ensuring conduction were put into a barrel-type plating apparatus and the processing was performed at 6 A for 75 minutes.

As described above, an electronic component having an external electrode was produced.

Comparative Example 3

An Ni layer was formed on a Cu plate using a plating solution containing nickel salts (nickel sulfate: 240 g/L, and nickel chloride: 45 g/L) and a buffer (boric acid, 30 g/L) according to the following Method (B3-1).

Method (B3-1)

Processing was performed at 0.17 A (an average current density of 0.50 A/dm$^2$) for 10 minutes according to a rack plating method.

After the Ni layer was formed, a plating layer of Sn was formed using a plating solution containing an Sn salt, a complexing agent, and an additive according to Method (B3-2).

Method (B3-2)

Processing was performed at 0.085 A (an average current density of 0.25 A/dm$^2$) for 40 minutes according to a rack plating method.

A component having a plating film was produced as described above.

<Adherence Test>

The electronic components obtained in Example 3 and Comparative Examples 1 and 2 were mounted on substrates, and the adherence between the electronic component and the substrate was measured. A method for evaluating the adherence is as follows:

The electronic components obtained in Example 3 and Comparative Examples 1 and 2 were reflow-mounted on a printed circuit board using SAC, and then the adherence was measured according to a lateral push test.

Conditions of the lateral push test are as follows:

Apparatus

Adherence strength evaluation machine (bond tester Dage4000; manufactured by Dage)

Module: BS5 kg

Tool: SHR-187-2000 (1 mm in width)

Evaluation Conditions

Module: BS5 kg

Tool: SHR-187-2000 (1 mm in width)

Descending speed (μm/s): 100

Shear speed (μm/s): 100

Shear height (μm): 100

Fracture recognition point: 30% the number of n: 10

Figure 13:
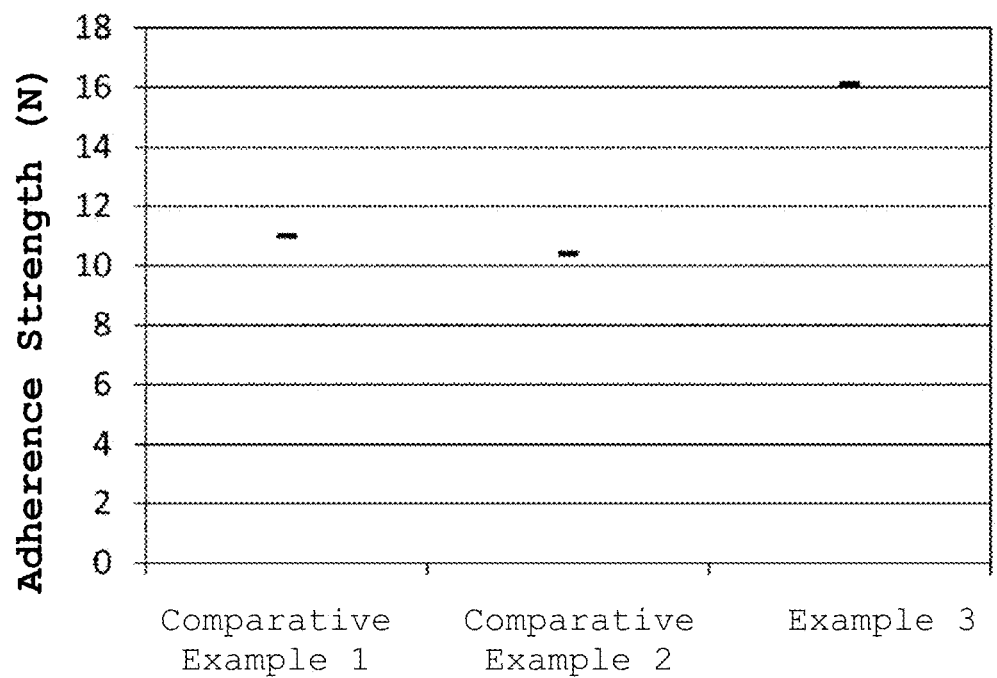
FIG. 13 is a graph showing results in adherence test between an electronic component and a substrate, obtained in Example 3 and Comparative Examples 1 and 2.

The results of the adherence test are shown in Table below and in FIG. 13. The numerical values are average values of n10.

TABLE 3

| | adherence strength (average value of n10): N |
|---|---|
| Comparative Example 1 | 11.0 |
| Comparative Example 2 | 10.6 |
| Example 3 | 16.1 |

<Heat Resistance Evaluation>

The electronic component obtained in Example 4, the components obtained in Test Example 3 and Comparative Example 3 were each allowed to stand at 150° C. for 1000 hours or at 200° C. for 1000 hours. Thereafter, an element mapping of the section was performed under the following conditions.

Analytical Instrument: A Scanning Electron Microscope (FE-SEM/EDX)

Manufactured by Hitachi High-Technologies Corporation

FE-SEM:SU8230/EDX:5060FQ

Magnification: 10,000 times

Figure 14:
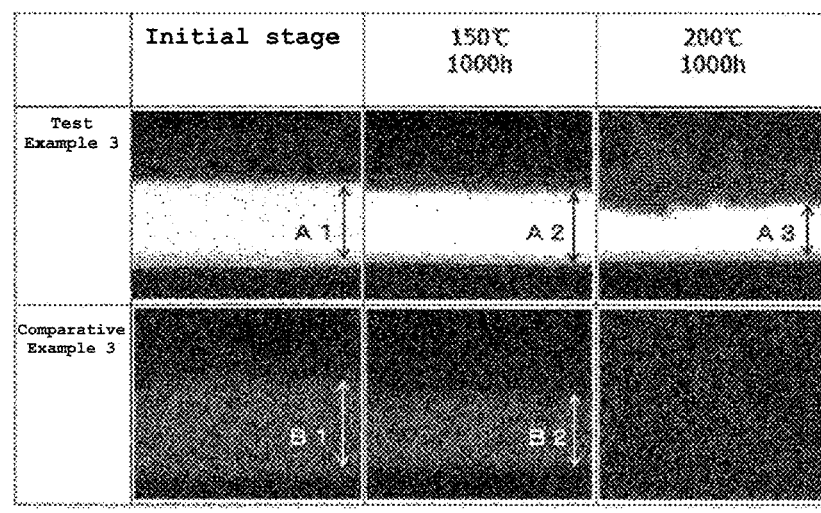
FIG. 14 shows evaluation results in heat resistance test of external electrodes obtained in Test Example 3 and Comparative Example 3.
Figure 15:
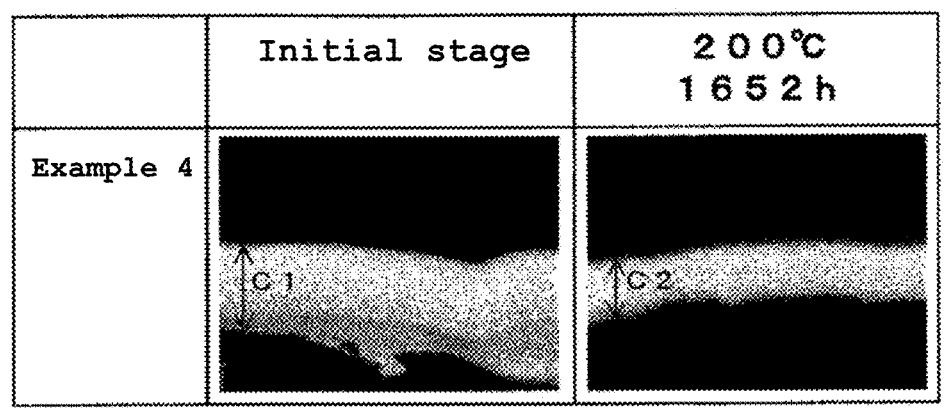
FIG. 15 shows evaluation results in heat resistance test of an external electrode obtained in Example 4.

FIG. 14 and FIG. 15 show the results of the element mapping. The term "Initial" is a sectional view before the heat resistance test. FIG. 14 shows the results in Test Example 3 and Comparative Example 3, specifically, the results at the initial stage, after a lapse of 1000 hours at 150° C., and after a lapse of 1000 hours at 200° C. FIG. 15 shows the results in Example 4, specifically, the results at the initial stage, and the results after a lapse of 1652 hours at 200° C.

In Test Example 3, a white layer could be confirmed at an area near the center of each sectional view (FIG. 14). This is a place where there is the Ni—Fe based alloy. In Test Example 3, the widths of the white layers in the sectional view at the initial stage, the sectional view after the lapse of 1000 hours at 150° C., and the sectional view after the lapse of 1000 hours at 200° C. are defined as A1, A2, and A3, respectively. After the lapse of 1000 hours at 150° C., a white layer having a width (width A2) equivalent to the initial width A1 was observed. In addition, after the lapse of 1000 hours at 200° C., it was confirmed that the state of the layer was maintained although the width was slightly reduced from the initial width A1.

In Example 4, a white layer could be confirmed at an area near to the center of each sectional view (FIG. 15). This is a place where there is the Ni—Fe based alloy. In Example 4, the widths of white layers in the sectional view in the initial stage and the sectional view after the lapse of 1652 hours at 200° C. are defined as C1 and C2. After the lapse of 1652 hours at 200° C., it was confirmed that the state of the layer was maintained although the width slightly decreased from the width C1 at the initial stage.

In Comparative Example 3, in the sectional views in the initial stage and after the lapse of 1000 hours at 150° C., a while layer could be confirmed at an area near to the center (FIG. 14). This is a place where there is Ni. In Comparative Example 3, after the lapse of 1000 hours at 150° C., a white layer having a width (width B2) equivalent to the width B1 of the white layer in the initial sectional view was observed. However, after the lapse of 1000 hours at 200° C. in Comparative Example 3 in FIG. 14, the white layer could not be confirmed and the Ni layer disappeared.

The present invention can be used in applications in which the bonding between the electronic component and the substrate is required.

DESCRIPTION OF REFERENCE SYMBOLS

1: Component body 3a, 3b: Internal electrode

5: Dielectric portion (dielectric layer)

7a, 7b: External electrode

7a', 7b': External electrode 9a, 9b: Solder joint portion
10: Electronic component
13a, 13b: Electrode portion
20: Mounting structure
21, 23: Layer having Ni—Fe based alloy brought into contact with layer 22
22, 22': Layer having Ni—Fe based alloy

The invention claimed is:

1. An electronic component comprising:
a component body; and
an external electrode on a surface of the component body, wherein
the external electrode includes a layer having an alloy of at least one first metal and at least one second metal,
the at least one first metal is selected from the group consisting of metals of Group 9 to Group 11 of the Periodic Table of the Elements,
the at least one second metal has a melting point higher than a melting point of the at least one first metal,
in the layer having the alloy, a concentration of the at least one second metal continuously changes in a thickness direction of the external electrode, and at least one first portion of the layer having the alloy has the concentration of the at least one second metal increasing in the thickness direction, and at least one second portion of the layer having the alloy has the concentration of the at least one second metal decreasing in the thickness direction, and
wherein the layer having the alloy includes a plurality of layers laminated in the thickness direction of the external electrode, each of the plurality of layers having a different concentration of the at least one second metal.

2. The electronic component according to claim 1, wherein the layer having the alloy has at least one third portion where a concentration of the at least one first metal increases in the thickness direction of the external electrode and at least one fourth portion where the concentration of the at least one first metal decreases in the thickness direction of the external electrode.

3. The electronic component according to claim 1, wherein the layer having the alloy includes a plurality of areas where the concentrations of the at least one second metal are different from each other.

4. The electronic component according to claim 1, wherein, in the layer having the alloy, a ratio of the at least one second metal contained therein is in a range of 1 to 99% by mass.

5. The electronic component according to claim 1, wherein the at least one first metal is selected from the group consisting of Ni, Co, Ag, and Cu.

6. The electronic component according to claim 5, wherein the at least one second metal is selected from the group consisting of W, Re, Os, Mo, Nb, Ir, Ru, Rh, Cr, Pt, Ti, Lu, Pd, Fe, and Co.

7. The electronic component according to claim 1, wherein the at least one second metal is selected from the group consisting of W, Re, Os, Mo, Nb, Ir, Ru, Rh, Cr, Pt, Ti, Lu, Pd, Fe, and Co.

8. The electronic component according to claim 1, wherein the alloy is an Ni—Fe based alloy.

9. A mounting structure comprising:
the electronic component according to claim 1; and
a substrate having an electrode portion,
wherein the external electrode of the electronic component is joined to the electrode portion of the substrate through a solder joint portion.

10. The mounting structure according to claim 9, wherein the at least one first metal is selected from the group consisting of Ni, Co, Ag, and Cu.

11. The mounting structure according to claim 10, wherein the at least one second metal is selected from the group consisting of W, Re, Os, Mo, Nb, Ir, Ru, Rh, Cr, Pt, Ti, Lu, Pd, Fe, and Co.

12. The mounting structure according to claim 9, wherein the at least one second metal is selected from the group consisting of W, Re, Os, Mo, Nb, Ir, Ru, Rh, Cr, Pt, Ti, Lu, Pd, Fe, and Co.

13. The mounting structure according to claim 9, wherein the alloy is an Ni—Fe based alloy, an Ni—Pd based alloy, or an Ni—W alloy.

14. The mounting structure according to claim 9, wherein the alloy is an Ni—Fe based alloy.

15. The mounting structure according to claim 9, wherein an intermetallic compound derived from the external electrode and derived from the solder joint portion is present proximal to an interface between the external electrode and the solder joint portion.

16. The mounting structure according to claim 9, wherein the layer having the alloy has at least one third portion where a concentration of the at least one first metal increases in the thickness direction of the external electrode and at least one fourth portion where the concentration of the at least one first metal decreases in the thickness direction of the external electrode.

17. An electronic component comprising:
a component body; and
an external electrode on a surface of the component body, wherein
the external electrode includes a layer having an alloy of at least one first metal and at least one second metal,
the at least one first metal is selected from the group consisting of metals of Group 9 to Group 11 of the Periodic Table of the Elements,
the at least one second metal has a melting point higher than a melting point of the at least one first metal,
in the layer having the alloy, a concentration of the at least one second metal continuously changes in a thickness direction of the external electrode, and at least one first portion of the layer having the alloy has the concentration of the at least one second metal increasing in the thickness direction, and at least one second portion of the layer having the alloy has the concentration of the at least one second metal decreasing in the thickness direction, and
wherein there are 1 to 100, per 1 μm, of the at least one first portion where the concentration of the at least one second metal increases.

18. A mounting structure comprising:
an electronic component comprising:
a component body; and
an external electrode on a surface of the component body, wherein
the external electrode includes a layer having an alloy of at least one first metal and at least one second metal,
the at least one first metal is selected from the group consisting of metals of Group 9 to Group 11 of the Periodic Table of the Elements,
the at least one second metal has a melting point higher than a melting point of the at least one first metal,
in the layer having the alloy, a concentration of the at least one second metal continuously changes in a thickness direction of the external electrode, and at least one first portion of the layer having the alloy has the concentration of the at least one second metal increasing in the thickness direction, and at least one second portion of the layer having the alloy has the concentration of the at least one second metal decreasing in the thickness direction; and a substrate having an electrode portion, wherein the external electrode of the electronic component is joined to the electrode portion of the substrate through a solder joint portion, wherein an intermetallic compound derived from the external electrode and derived from the solder joint portion is present proximal to an interface between the external electrode and the solder joint portion, and wherein the intermetallic compound is an $FeSn_2$ based alloy.

19. A mounting structure comprising:

an electronic component comprising:
- a component body; and
- an external electrode on a surface of the component body, wherein
  the external electrode includes a layer having an alloy of at least one first metal and at least one second metal, the at least one first metal is selected from the group consisting of metals of Group 9 to Group 11 of the Periodic Table of the Elements, the at least one second metal has a melting point higher than a melting point of the at least one first metal, in the layer having the alloy, a concentration of the at least one second metal continuously changes in a thickness direction of the external electrode, and at least one first portion of the layer having the alloy has the concentration of the at least one second metal increasing in the thickness direction, and at least one second portion of the layer having the alloy has the concentration of the at least one second metal decreasing in the thickness direction; and a substrate having an electrode portion, wherein the external electrode of the electronic component is joined to the electrode portion of the substrate through a solder joint portion, and wherein the layer having the alloy includes a plurality of layers laminated in the thickness direction of the external electrode, each of the plurality of layers having a different concentration of the at least one second metal.

* * * * *